(12) United States Patent
Arngren et al.

(10) Patent No.: US 11,330,393 B2
(45) Date of Patent: May 10, 2022

(54) FIRST COMMUNICATION DEVICE, THIRD COMMUNICATION DEVICE, AND METHODS PERFORMED THEREBY TO MONITOR A SECOND COMMUNICATION DEVICE COMPRISED IN A GROUP OF COMMUNICATION DEVICES

(71) Applicant: Telefonaktiebolaget LM Ericsson (publ), Stockholm (SE)

(72) Inventors: Tommy Arngren, Södra Sunderbyn (SE); Stefan Wänstedt, Luleå (SE); Tomas Jönsson, Luleå (SE); Peter Ökvist, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 28 days.

(21) Appl. No.: 16/770,105

(22) PCT Filed: Dec. 12, 2017

(86) PCT No.: PCT/SE2017/051254
§ 371 (c)(1),
(2) Date: Jun. 5, 2020

(87) PCT Pub. No.: WO2019/117766
PCT Pub. Date: Jun. 20, 2019

(65) Prior Publication Data
US 2020/0351607 A1    Nov. 5, 2020

(51) Int. Cl.
*H04W 4/02* (2018.01)
*H04B 17/318* (2015.01)
(Continued)

(52) U.S. Cl.
CPC ............ *H04W 4/02* (2013.01); *H04B 17/318* (2015.01); *H04W 4/08* (2013.01); *H04W 4/10* (2013.01); *H04W 24/08* (2013.01); *H04W 88/04* (2013.01)

(58) Field of Classification Search
CPC ...... G01S 5/02; G01S 1/026; G01S 2205/006; G01S 2205/008; H04W 4/029;
(Continued)

(56) References Cited

U.S. PATENT DOCUMENTS

| 4,906,972 A | * | 3/1990 | Spencer | ............. G08B 21/0415 |
| | | | | 340/304 |
| 6,424,264 B1 | * | 7/2002 | Giraldin | .................. G08G 1/20 |
| | | | | 340/573.1 |

(Continued)

FOREIGN PATENT DOCUMENTS

| WO | 20140190279 A1 | 11/2014 |
| WO | 20170186658 A1 | 11/2017 |

OTHER PUBLICATIONS

PCT International Search Report and Written Opinion, dated Oct. 23, 2018 for International Application PCT/SE2017/051254, 12 pages.
(Continued)

*Primary Examiner* — Dung Hong
(74) *Attorney, Agent, or Firm* — Sage Patent Group

(57) ABSTRACT

Method performed by a first communication device operating in a wireless communications network. The wireless communications network comprises a group of communication devices. The first communication device determines that a number of communication devices, comprised in the group of communication devices, having reported that data about a position of a second communication device comprised in the group of communication devices has not been received within a time period, is above a threshold. The first
(Continued)

communication device then initiates transmitting an indication to at least one receiving device, indicating a result of the determination. Also disclosed is a method by a third communication device comprised in the group. The third communication device starts a timer defining the time period and, in the absence of the data received within the period, sends a notification of expiration of the timer.

20 Claims, 13 Drawing Sheets

(51) Int. Cl.
*H04W 4/08* (2009.01)
*H04W 4/10* (2009.01)
*H04W 24/08* (2009.01)
*H04W 88/04* (2009.01)

(58) Field of Classification Search
CPC ....... H04W 64/00; H04W 4/90; H04W 76/50; H04W 4/027; H04W 88/02; H04W 4/08; H04W 4/33; H04W 60/04
See application file for complete search history.

(56) References Cited

U.S. PATENT DOCUMENTS

| | | |
|---|---|---|
| 9,525,971 B1 | 12/2016 | Vega et al. |
| 2011/0053606 A1 | 3/2011 | Yao et al. |
| 2013/0316696 A1* | 11/2013 | Huang .............. H04W 52/0212 455/419 |
| 2014/0362710 A1* | 12/2014 | Mukherjee .......... H04L 67/1044 370/252 |
| 2017/0118592 A1* | 4/2017 | Patel ...................... H04W 4/023 |
| 2017/0201858 A1* | 7/2017 | Li .......................... H04W 4/021 |
| 2018/0048992 A1* | 2/2018 | Duale ................... H04W 4/021 |
| 2018/0249295 A1* | 8/2018 | Moraru ................. H04W 84/18 |

OTHER PUBLICATIONS

Extended European Search Report for European Patent Application No. 17934959.2 dated Jun. 2, 2021, 10 pages.

* cited by examiner a)

b)

a)

b)

FIRST COMMUNICATION DEVICE, THIRD COMMUNICATION DEVICE, AND METHODS PERFORMED THEREBY TO MONITOR A SECOND COMMUNICATION DEVICE COMPRISED IN A GROUP OF COMMUNICATION DEVICES

CROSS-REFERENCE TO RELATED APPLICATIONS

This application is a 35 U.S.C. § 371 national stage application for International Application No. PCT/SE2017/051254, entitled "FIRST COMMUNICATION DEVICE, THIRD COMMUNICATION DEVICE, AND METHODS PERFORMED THEREBY TO MONITOR A SECOND COMMUNICATION DEVICE COMPRISED IN A GROUP OF COMMUNICATION DEVICES", filed on Dec. 12, 2017, the disclosures and contents of which are hereby incorporated by reference in their entireties.

TECHNICAL FIELD

The present disclosure relates generally to a first communication device and methods performed thereby for monitoring a second communication device comprised in a group of communication devices. The present disclosure also relates generally to a third communication device, and methods performed thereby for monitoring the second communication device comprised in the group of communication devices. The present disclosure further relates generally to a computer program product, comprising instructions to carry out the actions described herein, as performed by the first communication device, or the third communication device. The computer program product may be stored on a computer-readable storage medium.

BACKGROUND

Communication devices within a wireless communications network may be wireless devices such as e.g., User Equipments (UEs), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g. between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

Communication devices may also be network nodes, such as radio network nodes, e.g., Transmission Points (TP). The wireless communications network covers a geographical area which may be divided into cell areas, each cell area being served by a network node such as a Base Station (BS), e.g. a Radio Base Station (RBS), which sometimes may be referred to as e.g., gNB, evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

Device-to-device (D2D) communication is a well-known and widely used component of many existing wireless technologies, including ad hoc and cellular networks. Examples of D2D communication include Bluetooth and several variants of the IEEE 802.11 standards suite, such as WiFi Direct. These systems operate in unlicensed spectrum.

Device-to-device communications is being proposed as a means to take advantage of the proximity of communicating devices and at the same time to allow devices to operate in a controlled interference environment.

The possibility to identify a user's, i.e., a UE's, geographical location has enabled to provide a large variety of services, e.g., navigation assistance, social networking, location-aware advertising, emergency calls, etc. Different services may have different positioning accuracy requirements imposed by the application. Some regulatory requirements on the positioning accuracy for basic emergency services exist in some countries, i.e., FCC E911 in the US.

In many environments, the position may be accurately estimated by using positioning methods based on Global Navigation Satellite Systems (GNSS), a.k.a. Global Positioning System (GPS). Networks may often have to assist UEs in order to improve the terminal receiver sensitivity and GPS startup performance, that is, the Time To First Fix (TTFF). TTFF may be understood as a measure of the time required for a GPS receiver to acquire satellite signals and navigation data, and calculate a position solution, called a fix. Assisted-GPS positioning, or A-GPS may be understood as a system that often significantly improves the startup performance. GPS or A-GPS receivers, however, are not necessarily available in all wireless terminals. Furthermore, GPS is known to often fail in indoor environments and urban canyons. Positioning of UEs is especially important for Proximity Services (ProSe), e.g., D2D, UEs used by Public Safety personnel.

Given the limited transmission rate of ProSe, or D2D, it may be necessary to use the radio as efficiently as possible, and a method to spread used position within a user group has been suggested in WO2017188872.

In that context, it has been suggested that in each D2D transmission, as soon as there is no more voice data to send, a set of positioning data, e.g., position, speed, direction, is appended to make use of the remaining transmission resources of the transmission cycle, or to synchronize transmission of positioning data with silence indicators from the speech encoder. That is, in frames where the encoder signals "silence"; i.e., generates no audible data, positioning data are sent instead.

As a result, if this feature is used by public safety first responders, the position of each transmitting UE may be made available to the group of users that are able to receive the transmission without having to make use of any more resources than what have been allocated to the voice communication.

Nevertheless, existing methods to monitor a presence of a communication device may still result in wastage of radio resources, increased latency and reduced capacity of a communications network.

SUMMARY

It is an object of embodiments herein to improve the monitoring of a presence of a communication device in a communications network. It is a particular object of embodiments herein to improve the monitoring of a presence of a communication device in a group of communication devices operating in a communications network.

According to a first aspect of embodiments herein, the object is achieved by a method, performed by a first communication device. The first communication device operates in a wireless communications network. The wireless communications network comprises a group of communication devices. The first communication device determines that a number of communication devices, comprised in the group of communication devices, having reported that data about a position of a second communication device comprised in the group of communication devices has not been received within a time period, is above a threshold. The first communication device also initiates transmitting an indication to at least one receiving device. The indication indicates a result of the determination.

According to a second aspect of embodiments herein, the object is achieved by a method, performed by a third communication device. The third communication device operates in the wireless communications network. The wireless communications network comprises a group of communication devices. The third communication device is comprised in the group of communication devices. The third communication device starts a respective timer defining the time period during which the data about the position of the second communication device comprised in the group of communication devices is to be received. The duration of the time period has been agreed to by the communication devices comprised in the group of communication devices. The third communication device sends a notification to at least one receiving device operating in the wireless communications network. The notification is of an expiration of the respective timer. The sending is performed after the expiration of the timer in the absence of data about the position of the second communication device having been received within the time period.

According to a third aspect of embodiments herein, the object is achieved by the first communication device, configured to operate in the wireless communications network. The first communication device is further configured to determine that the number of communication devices, configured to be comprised in the group of communication devices, having reported that the data about the position of the second communication device configured to be comprised in the group of communication devices has not been received within the time period, is above the threshold. The first communication device is also configured to initiate transmitting the indication to the at least one receiving device, the indication being configured to indicate the result of the determination.

According to a fourth aspect of embodiments herein, the object is achieved by the third communication device configured to operate in the wireless communications network. The wireless communications network is configured to comprise the group of communication devices. The third communication device is configured to be comprised in the group of communication devices. The third communication device is also configured to start the respective timer configured to define the time period during which the data about the position of the second communication device configured to be comprised in the group of communication devices is to be received. The duration of the time period has been agreed to by the communication devices comprised in the group of communication devices. The third communication device is further configured to send the notification to the at least one receiving device configured to operate in the wireless communications network. The notification is of the expiration of the respective timer. To send the notification is configured to be performed after the expiration of the timer in the absence of data about the position of the second communication device having been received within the time period.

According to a fifth aspect of embodiments herein, the object is achieved by a computer program, comprising instructions which, when executed on at least one processor, cause the at least one processor to carry out the method performed by the first communication device.

According to a sixth aspect of embodiments herein, the object is achieved by a computer-readable storage medium, having stored thereon the computer program, comprising instructions which, when executed on at least one processor, cause the at least one processor to carry out the method performed by the first communication device.

According to a seventh aspect of embodiments herein, the object is achieved by a computer program, comprising instructions which, when executed on at least one processor, cause the at least one processor to carry out the method performed by the third communication device.

According to an eighth aspect of embodiments herein, the object is achieved by a computer-readable storage medium, having stored thereon the computer program, comprising instructions which, when executed on at least one processor, cause the at least one processor to carry out the method performed by the third communication device.

By the first communication device determining that the number of communication devices having reported that the data about the position of the second communication device has not been received within the time period is above the threshold, and initiating transmitting the indication, the first communication device enables to detect if a member of the group of communication devices disappears and to notify the appropriate party, e.g., the dispatch or other communication devices in the group. This may be performed if some type of emergency is perceived, without requiring that any member of the group actively calls and waits for an active response from a user, which automates and makes more effective the monitoring of communication devices in the group of communication devices. Notifications among the communication devices in the group, such as that sent by the third communication device, allow the presence or position of each of the communication devices in the group to be known by all the communication devices in the group, taking advantage of the data collected by each of the communication devices in the group and shared among the communication devices in the group, so that the first communication device may determine if the second communication device is missing or not, and avoid sending unnecessary indications about the second communication device being missing.

BRIEF DESCRIPTION OF THE DRAWINGS

Examples of embodiments herein are described in more detail with reference to the accompanying drawings, and according to the following description.

DETAILED DESCRIPTION

As part of the development of embodiments herein, one or more problems with the existing technology will first be identified and discussed.

According to existing methods, it may be possible to spread user positions within a user group. However, there are still few or no possibilities to identify if a certain user is "lost" or "missing", in the sense that his or her communication device is no longer within the desired group.

In today's approach, it is often only possible to understand that e.g., a certain National Safety Public Safety (NSPS) colleague is missing given that he/she does not respond to a directed call or otherwise fails to actively respond.

Certain aspects of the present disclosure and their embodiments may provide solutions to this challenge or other challenges. There are, proposed herein, various embodiments which address one or more of the issues disclosed herein.

Particular embodiments herein may be understood to address this problem in existing methods by continuously monitoring status of members of a group of communication devices, with each communication device within the group dispatching positioning data among its group members, and thereby detecting if group members have lost connection to the group.

Particular embodiments herein may be understood to relate to a Mission Critical Push To Talk (MCPTT) trigger of lost group member(s).

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Figure 1:
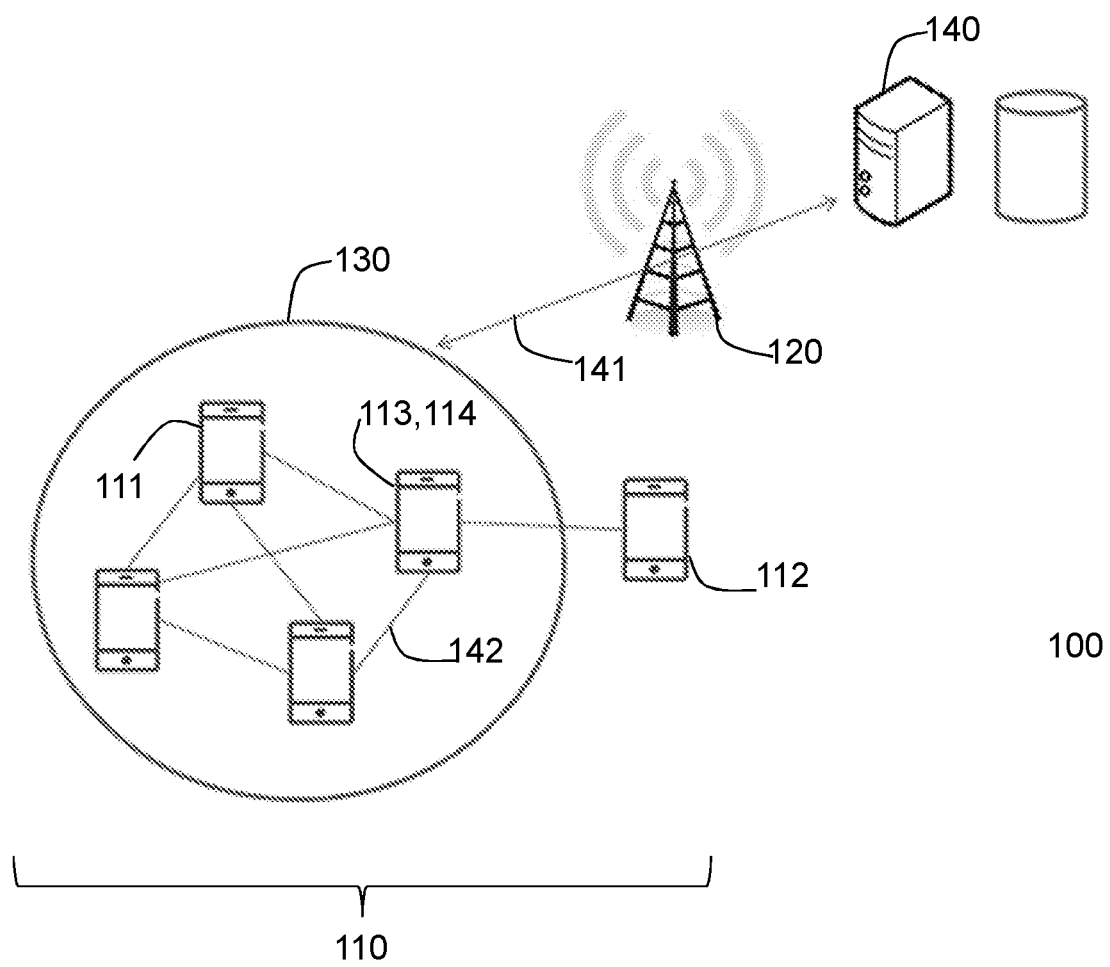
FIG. 1 is a schematic diagram illustrating a communications network, according to embodiments herein.

FIG. 1 depicts a non-limiting example of a wireless communications network 100, sometimes also referred to as a wireless communications system, cellular radio system, or cellular network, in which embodiments herein may be implemented. The wireless communications network 100 may be support one or more technologies, such as, for example, a Bluetooth network, a Low Rate Wireless Personal Access Network (LR-WPAN) as defined in e.g. IEEE 802.15.4, a Zigbee network, a Thread mesh network, Long-Term Evolution (LTE), LTE Frequency Division Duplex (FDD), LTE Time Division Duplex (TDD), LTE Half-Duplex Frequency Division Duplex (HD-FDD), or LTE operating in an unlicensed band, a 5G system, 5G network, or Next Gen System or network, WCDMA, Universal Terrestrial Radio Access (UTRA) TDD, GSM network, GERAN network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from LTE may be used in this disclosure to exemplify embodiments herein, this should not be seen as limiting the scope of the embodiments herein to only the aforementioned system. The wireless communications network may also be understood as a non-cellular system, comprising network nodes which may serve receiving nodes, such as wireless devices, with serving beams. This may be a typical case, e.g., a in a 5G network.

The wireless communications network 100 comprises a plurality of communication devices or nodes, whereof a group of communication devices 110 is depicted in the non-limiting example of FIG. 1. The group of communication devices 110 comprises at least a first communication device 111, a second communication device 112, and a third communication device 113. The group of communication devices 110 may comprise additional communication devices, which are represented in the particular non-limiting example of FIG. 1 with two communication devices.

Each of the communication devices comprised in the group of communication devices 110 may be a wireless device, that is, a wireless communication device such as a UE, or a 5G UE, which may also be known as e.g., a mobile terminal, wireless terminal and/or mobile station, a mobile telephone, cellular telephone, or laptop with wireless capability, just to mention some further examples. Any of the wireless devices comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system. Each of the communication devices comprised in the group of communication devices 110 is enabled to communicate wirelessly in the wireless communications network 100. The communication may be performed e.g., via a RAN, and possibly the one or more core networks, which may be comprised within the wireless communications network 100. Each of the communication devices comprised in the group of communication devices 110 may support Push for Talk technology. In some particular embodiments, the group of communication devices 110 may be a group of UEs with D2D capability. In some particular embodiments, the group of communication devices 110 may be an MCPTT group of UEs.

The wireless communications network 100 further comprises a receiving device 114. The receiving device 114 may be any of the communication devices in the group of communication devices 110, such as at least the third communication device 113 comprised in the group of communication devices 110, or all the communication devices comprised in the group of communication devices 110. In some embodiments, the receiving device 114 may be a network node 120 operating in the wireless communications network 100.

The wireless communications network 100 may comprise a plurality of network nodes, whereof a network node 120 is depicted in the non-limiting example of FIG. 1. The network node 120 may be a radio network node. That is, a radio base station such as a base station or transmission point, for example an eNB. a New Radio (NR) NodeB (gNB), or any other network node with similar features capable of serving a wireless device, such as a user equipment or a machine type communication device, in the wireless communications network 100.

The wireless communications network 100 covers a geographical area which may be divided into cell areas, wherein each cell area may be served by a network node, although, one radio network node may serve one or several cells. The wireless communications network 100 may comprises a cell 130. In the non-limiting example depicted in FIG. 1, the network node 120 serves the cell 130. Even in examples wherein the wireless communications network 100 may not be referred to as a cellular system, if the network node 120 serves receiving nodes, such as any of the communication devices in the group of communication devices 110, with serving beams, the areas of coverage of the beams may still be referred to as cells. The network node 120 may be of different classes, such as, e.g., macro eNodeB, home eNodeB or pico base station, based on transmission power and thereby also cell size. The network node 120 may support one or several communication technologies, and its name may depend on the technology and terminology used. In LTE, the network node 120, which may be referred to as an eNB, may be directly connected to one or more core networks, which are not depicted in FIG. 1 for simplicity. In some examples, the network node 120 may be a distributed node, such as a virtual node in the cloud, and it may perform its functions entirely on the cloud, or partially, in collaboration with a radio network node.

In some embodiments, the receiving device 114 may be a computer system 140, e.g., a server, a desktop, or another wireless device. For example, the receiving device 114 may be a dispatch performing some managing function of the group of communication devices 110. In FIG. 1, the computer system 140 is a dispatch accessed via the network node 120.

Any of the communication devices in the group of communication devices 110 may be configured to communicate within the wireless communications network 100 with the computer system 140 over a first link 141, e.g., a radio link, which may be a direct, single hop link, or an indirect, multi-hop link, as in the example depicted on FIG. 1. The communication devices in the group of communication devices 110 may be configured to communicate with one another over a respective second link 142, e.g., a radio link, which may be a direct, single hop link, or an indirect, multi-hop link, as in the example depicted on FIG. 1. Some examples of the respective second link 142 are depicted in FIG. 1 by straight lines between the communication devices in the group of communication devices 110.

Note that although terminology from LTE and MCPTT has been used in this disclosure to exemplify the embodiments herein, this should not be seen as limiting the scope of the embodiments herein to only the aforementioned system. Other wireless systems with similar features, may also benefit from exploiting the ideas covered within this disclosure.

In general, the usage of "first", "second", "third", "fourth" and/or "fifth" herein may be understood to be an arbitrary way to denote different elements or entities, and may be understood to not confer a cumulative or chronological character to the nouns they modify.

Embodiments herein may be understood to aim at detecting if one of the communication devices in the group of communication devices 110, for example, the second communication device 112, disappears without requiring that any member of the group of communication devices 110 actively calls and waits for an active response from the second communication device 112. Embodiments herein may achieve this by continuously monitoring a status of the second communication device 112, dispatching positioning data among group of communication devices 110 and detecting if the second communication device 112 has lost connection to the group of communication devices 110.

Embodiments herein may monitor a position of the second communication device 112 via a timer. Each of the communication devices in the group of communication devices 110 may keep a respective timer. The respective timer may define a time period during which data about a position of the second communication device 112 is to be received. The duration of the time period may have been agreed to by the communication devices comprised in the group of communication devices 110. The respective timer may be, for example, a Position-Update-Timer (PUT). The group of communication devices 110 may be considered to be intact if position data is updated within the Position-Update-Timer (PUT). However, if the PUT is expired, a PUT expiration notification may be distributed among the communication devices in the group of communication devices 110 to verify if the second communication device 112 is missing or not.

Figure 2:
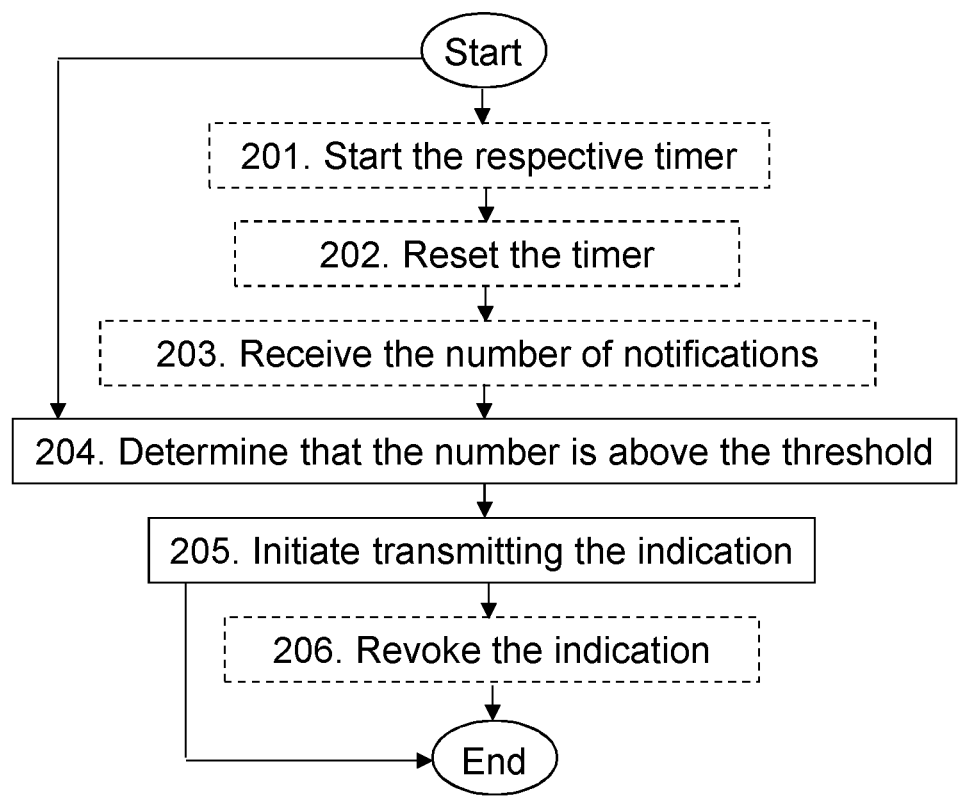
FIG. 2 is a flowchart depicting a method in a first communication device, according to embodiments herein.

Embodiments of method performed by the first communication device 111, will now be described with reference to the flowchart depicted in FIG. 2. The wireless communications network 100 comprises the group of communication devices 110. The method may be understood to be for monitoring a communication device in the group of communication devices 110, such as the second communication device 112. The first communication device 111 operates in the wireless communications network 100.

The method may comprise the actions described below. Several embodiments are comprised herein. In some embodiments some of the actions may be performed. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 2, optional actions are indicated with dashed boxes.

Action 201

As stated earlier, in some embodiments, the first communication device 111 may be comprised in the group of communication devices 110. In such embodiments, the first communication device 111 may in this Action 201, start the respective timer, that is, its respective timer, defining the time period during which the data is to be received. The data may be understood as the data about the position of the second communication device 112.

One or more settings of the respective timer may be explicitly set for each communication device comprised in the group of communication devices 110. In other examples, the one or more settings may be adaptively derived by each communication device comprised in the group of communication devices 110, e.g., based on a previous pattern of "silent frames" on groups conversation.

In some embodiments, the time period may be defined according to at least one of the following: a) a previous pattern of silent frames on group communications maintained among the communication devices comprised in the group of communication devices 110, b) a time of the day the determining 204 is performed, c) a degree of mobility of each of the communication devices comprised in the group of communication devices 110, d) a distance between each of the communication devices comprised in the group of communication devices 110, and e) a number of communication devices comprised in the group of communication devices 110.

The degree of mobility may be e.g., speed.

Action 202

In some embodiments, the first communication device 111 may, in this Action 202, reset the started respective timer based on at least one transmission received from the second communication device 112 before expiration of the time period.

In some examples, when the user of the first communication device 111 is notified that the respective timer for the second communication device 112 is about to expire, and the user of the second communication device 112 may be seen by said user, the respective timer for the second communication device 112 may be manually reset. A manual reset may be further limited by a requirement on the radio signal strength between the first communication device 111 and the second communication device 112. For example, if the radio condition is above a second threshold, and a visual inspection shows that the user of the second communication device 112 is within sight, the respective timer may be reset.

Action 203

In this Action 203, the first communication device 111 may receive, from the communication devices comprised in the group of communication devices 110, a number of notifications of expiration of the respective timers. The first communication device 111 may receive the number of notifications from other communication devices in the group of communication devices 110, if the first communication device 111 is itself comprised in the group of communication devices 110.

The receiving in this Action 203 may be performed via the respective second link 142.

Each of the notifications may be sent to all the communication devices in the group of communication devices 110. That is, each of the notifications may be a group notification.

Optionally, the first communication device 111 may receive in this Action 203, from any of the communication devices comprised in the group of communication devices 110, e.g., from the third communication device 113, a second notification comprising the data about the position of the second communication device 112 they may have collected during the time period, e.g., a position update.

Action 204

In this Action 204, the first communication device 111 determines that a number of communication devices, comprised in the group of communication devices 110, having reported that the data about the position of the second communication device 112 comprised in the group of communication devices 110 has not been received within the time period, is above a threshold.

The determining in this Action 204 may be understood to be based on the respective timer kept by each of the communication devices comprised in the group of communication devices 110. As stated earlier, the respective timer defines the time period during which the data is to be received. The duration of the time period has been agreed to by the communication devices comprised in the group of communication devices 110.

The threshold may depend on several factors such as, e.g. the same factors according to which the time period may be defined. That is, at least one of the following: a) the previous pattern of silent frames on group communications maintained among the communication devices comprised in the group of communication devices 110, b) the time of the day the determining 204 is performed, c) the degree of mobility of each of the communication devices comprised in the group of communication devices 110, d) the distance between each of the communication devices comprised in the group of communication devices 110, and e) the number of communication devices comprised in the group of communication devices 110.

In embodiments wherein the first communication device 111 may have performed Action 203, the determining in this Action 204 may be based on the received number of notifications.

Action 205

After performing Action 204, the first communication device 111, in this Action 205, initiates transmitting an indication to at least one receiving device 114, the indication indicating a result of the determination.

Initiating may be understood as e.g., triggering, starting, or enabling, the transmitting by itself or another communication device or node. The transmitting may be performed, e.g., via the first link 141 or the respective second link 142, based on the identity of the receiving device 114.

As described earlier, the at least one receiving device 114 may be at least one of: a) at least the third communication device 113 comprised in the group of communication devices 110, b) all the communication devices comprised in the group of communication devices 110, and c) the network node 120 operating in the wireless communications network 100.

The first communication device 111 may be any of the communication devices in the group of communication devices 110. In some examples, all communication devices in the group of communication devices 110 may perform the actions as described herein for the first communication device 111. In some other examples, the first communication device 111 may be considered a master device within the group of communication devices 110, which may be solely responsible of performing Action 204 and 205. In other examples, the first communication device 111 may be the communication device in the group of communication devices 110 having a radio connection, or a best radio connection with the receiving device 114.

In the embodiments wherein the first communication device 111 may initiate transmitting the indication to all the communication devices comprised in the group of communication devices 110, the indication may be understood to be a group indication, or group notification. For example, the first communication device 111 transmit a group notification for "missing second communication device 112", along with its latest known position. The dispatch of the group notification may, apart from the notification itself and the user's latest known position, also include a measure of a corresponding signal strength between, e.g., the third communication device 113 and the second communication device 112, to indicate if the lost position of the second communication device 112 is likely to be caused by signal attenuation, that is, having low signal strength between the third communication device 113 and the second communication device 112, or likely by some other "non-radio" reason, e.g., having high signal strength between the third communication device 113 and the second communication device 112.

According to the foregoing, the indication may comprise at least one of: a) a first indication that the second communication device 112 is missing, e.g., "missing second communication device 112", b) a second indication of a latest known position of the second communication device 112, and c) a third indication of a last measured signal strength between the second communication device 112 and at least one of the communication devices comprised in the group of communication devices 110.

In case the first communication device 111 may detect a respective timer may have expired for another communication device, e.g., UE X, within the group of communication devices 110, then it may check the respective timer status with the other communication devices within the group of communication devices 110.

If at least one communication device has an updated position of UE X, then the respective timers for the UE X may be reset.

If none of the communication devices within the group of communication devices 110 has an updated position of UE X, the UE X respective timer may be expired for the entire group and the receiving device 114, e.g., the central dispatch may be notified.

Action 206

In the embodiments wherein the first communication device 111 may have initiated transmitting the indication, the first communication device 111 may, in this Action 206, revoke, the indication to the at least one receiving device 114, based on at least one transmission detected from the second communication device 112 after expiration of the time period. The at least one transmission may be detected by the first communication device 111, or another communication device in the group of communication devices 110, receiving it from the second communication device 112 directly, or via another communication device, e.g., in the group of communication devices 110.

It may be understood that what has been described herein for continuously monitoring the status of the second communication device 112, may also be performed for each communication device in the group of communication devices 110. That is, each communication device in the group of communication devices 110 may dispatch positioning data among the group of communication devices 110, so that it may be detected if, and/or which group members have lost connection to the group.

Figure 3:
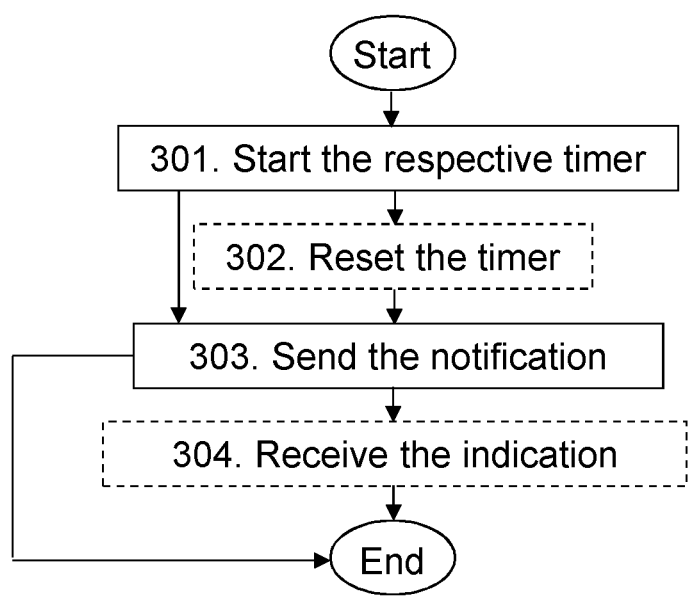
FIG. 3 is a flowchart depicting a method in a third communication device, according to embodiments herein.

Embodiments of a method performed by the third communication device 113 operating in the wireless communications network 100, will now be described with reference to the flowchart depicted in FIG. 3. The method may be understood to be for monitoring a communication device in the group of communication devices 110, such as the second communication device 112. The wireless communications network 100 comprising the group of communication devices 110. The third communication device 113 is comprised in the group of communication devices 110.

The method may comprise one or more of the following actions. Several embodiments are comprised herein. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 3, optional actions are indicated with dashed boxes.

The detailed description of some of the following corresponds to the same references provided above, in relation to the actions described for the first communication device 111, and will thus not be repeated here to simplify the description. For example, the respective timer may be, a Position-Update-Timer (PUT).

Action 301

The third communication device 113 in this Action 301, starts the respective timer, that is, its respective timer. As described earlier, the respective timer defines the time period during which the data about the position of the second communication device 112 comprised in the group of communication devices 110 is to be received. The duration of the time period has been agreed to by the communication devices comprised in the group of communication devices 110.

As described earlier, the time period is defined according to at least one of the following: a) the previous pattern of silent frames on group communications maintained among the communication devices comprised in the group of communication devices 110, b) the time of the day the respective timer is started, c) the degree of mobility of each of the communication devices comprised in the group of communication devices 110, d) the distance between each of the communication devices comprised in the group of communication devices 110, and e) the number of communication devices comprised in the group of communication devices 110.

Action 302

Similarly to the first communication device 111, the third communication device 113, in this Action 302 may reset the started respective timer based on at least one transmission received from the second communication device 112 before expiration of the time period.

In some examples, when the user of the third communication device 113 is notified that the respective timer for the second communication device 112 is about to expire, and the user of the second communication device 112 may be seen by said user, the respective timer for the second communication device 112 may be manually reset, as described earlier. A manual reset may be further limited by a requirement on the radio signal strength between the third communication device 113 and the second communication device 112. For example, if the radio condition is above the second threshold, and a visual inspection shows that the user of the second communication device 112 is within sight, the respective timer may be reset.

Action 303

In this Action 303, the third communication device 113 sends a notification to at least one receiving device 114 operating in the wireless communications network 100. The notification is of the expiration of the respective timer. The sending in this Action 303 is performed after the expiration of the timer in the absence of data about the position of the second communication device 112 having been received within the time period.

The sending in this Action 303 may be performed via the respective second link 142.

The at least one receiving device 114 may be at least one of: a) the first communication device 111 comprised in the group of communication devices 110, and b) all the communication devices comprised in the group of communication devices 110.

The sent notification may comprise at least one of: a) the first indication that the second communication device 112 is missing, b) the second indication of the latest known position of the second communication device 112, c) the third indication of the last measured signal strength between the second communication device 112 and the third communication device 113.

As described earlier, optionally, the third communication device 113 may send in this Action 303, to any of the communication devices comprised in the group of communication devices 110, e.g., to the first communication device 111, the second notification comprising the data about the position of the second communication device 112 it may have collected during the time period, e.g., the position update.

In some examples, the third communication device 113 may revoke the notification to the at least one receiving device 114, based on at least one transmission detected from the second communication device 112 after expiration of the time period. The at least one transmission may be detected by the third communication device 113 receiving it from the second communication device 112 directly, or via another communication device, e.g., in the group of communication devices 110.

Action 304

The third communication device 113 may, in this Action 304, receive the indication from the first communication device 111 operating in the wireless communications network 100. As stated earlier, the indication indicates that the number of communication devices, comprised in the group of communication devices 110, having reported that the data about the position of the second communication device 112 has not been received within the time period, is above the threshold. The receiving in this Action 304 may be performed, e.g., via the first link 141 or the respective second link 142, based on the identity of the first communication device 111.

In some examples, the third communication device 113 may receive a new indication from the first communication device 111 revoking, the indication, based on at least one transmission detected from the second communication device 112 after expiration of the time period.

The methods just described as being implemented by the first communication device 111 and the third communication device 113 will now be described in further detail with several non-limiting illustrative examples, in relation to FIG. 4, FIG. 5 and FIG. 6, wherein the group of communication devices 110 is a Mission Critical Push To Talk (MCPTT) group comprising UEs. Each UE may be understood to have a user operating the UE.

Figure 4:
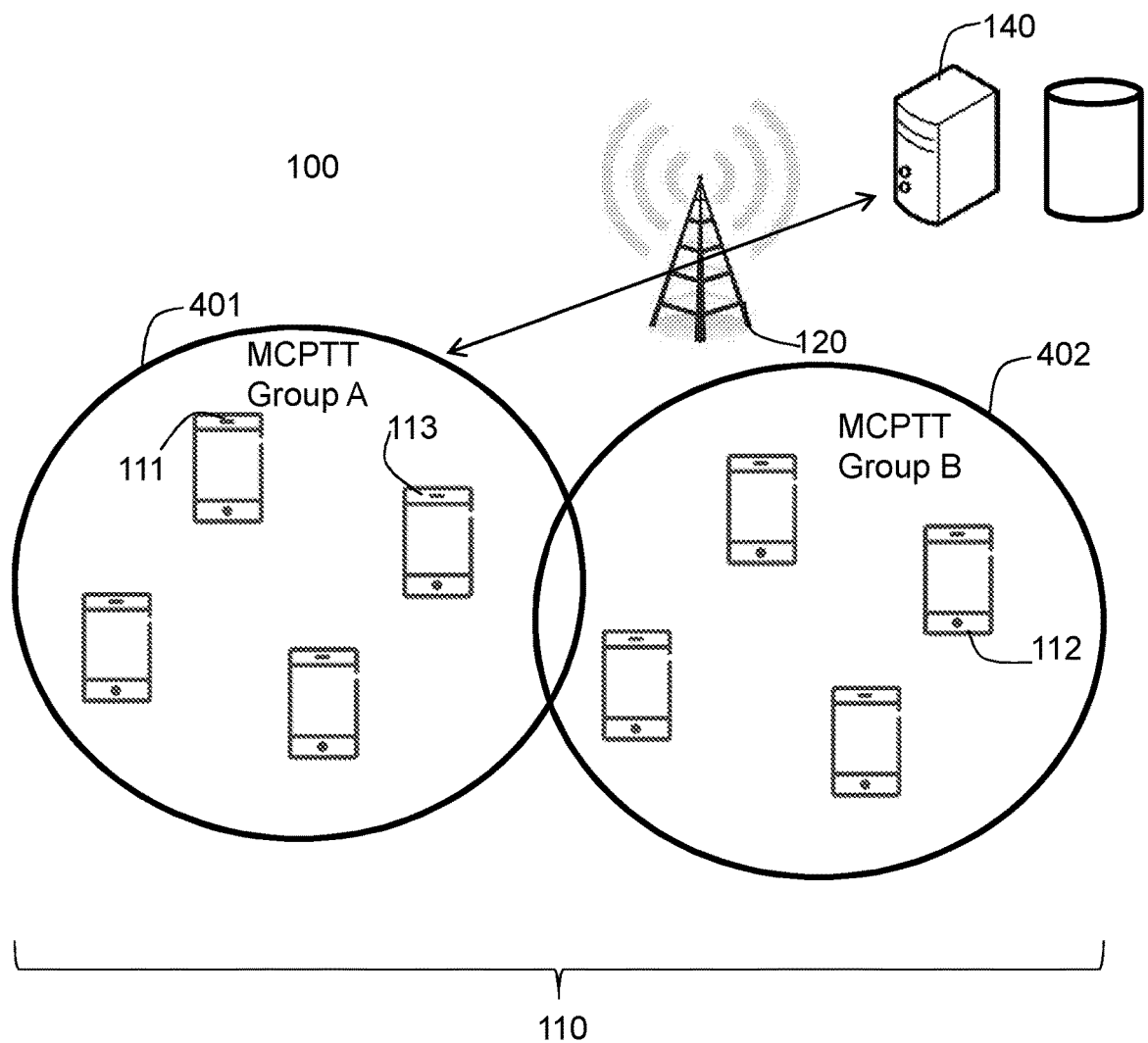
FIG. 4 is a schematic diagram illustrating an example of some actions of a according to embodiments herein.

As schematically illustrated in the example of FIG. 4, within the PTT group, UEs are located in two partly overlapping clusters; Group A 401, to the left, and Group B 402 to the right.

Users in the "rightmost" part of Group A 401 may be able to hear the complete set of users in Group B 402, but users in the leftmost part of Group A 401 may only be able to hear users in the overlapping areas of A-B.

The second notification that may optionally be sent in Action 303 according to some examples herein may provide for a mechanism to spread positions of far-right users in Group B 402, not heard by leftmost users in Group A 401, among all users in Groups A and B, which may be beneficial. For example, as indicated in FIG. 4, the first communication device 111, may receive the second notification comprising the data about the position of the second communication device 112, from the third communication device 113.

Figure 5:
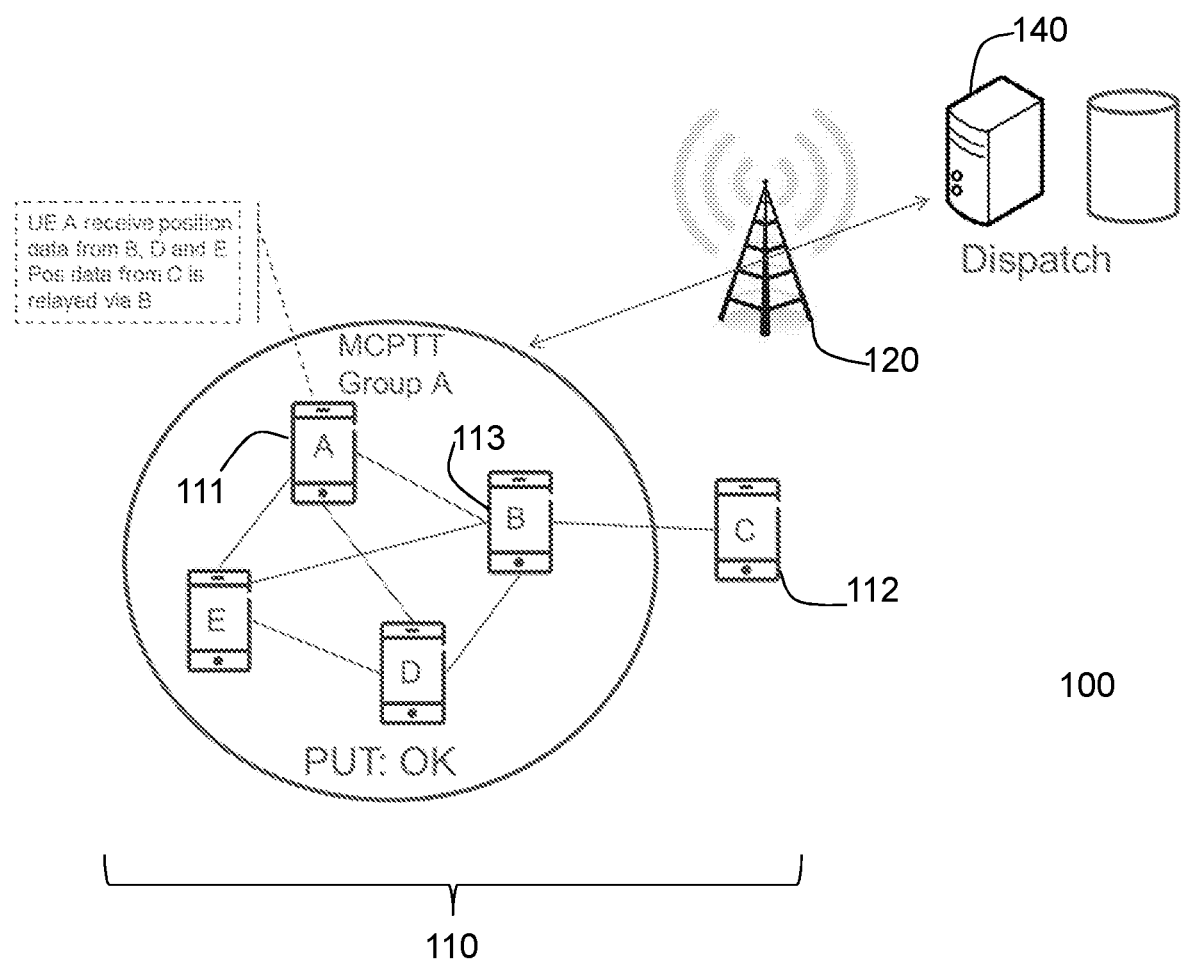
FIG. 5 is a schematic diagram illustrating an example of some actions of a according to embodiments herein.

FIG. 5 schematically illustrates another non-limiting example of embodiments herein. The respective timer is also here a Position Update Timer (PUT), whose policy has been agreed within the MCPTT group. Each UE dispatches its positioning data among its defined group of users. Each UE stores the position from other UEs in its defined group. According to Action 301, the third communication device 113 starts a PUT during which positioning data from the second communication device 112 should be updated. At some point before expiration of the PUT, as indicated in FIG. 5, the first communication device 111, labelled "A" in the Figure, may receive the second notification comprising the data about the position of the second communication device 112, labelled "C" in the Figure, from the third communication device 113, labelled "B" in the Figure. In this case the PUT is "OK", since the data has been received within the time period. The first communication device 111 may also receive the, respective, data from communication device "D" and communication device "E" via the, direct, respective second link 142.

Figure 6:
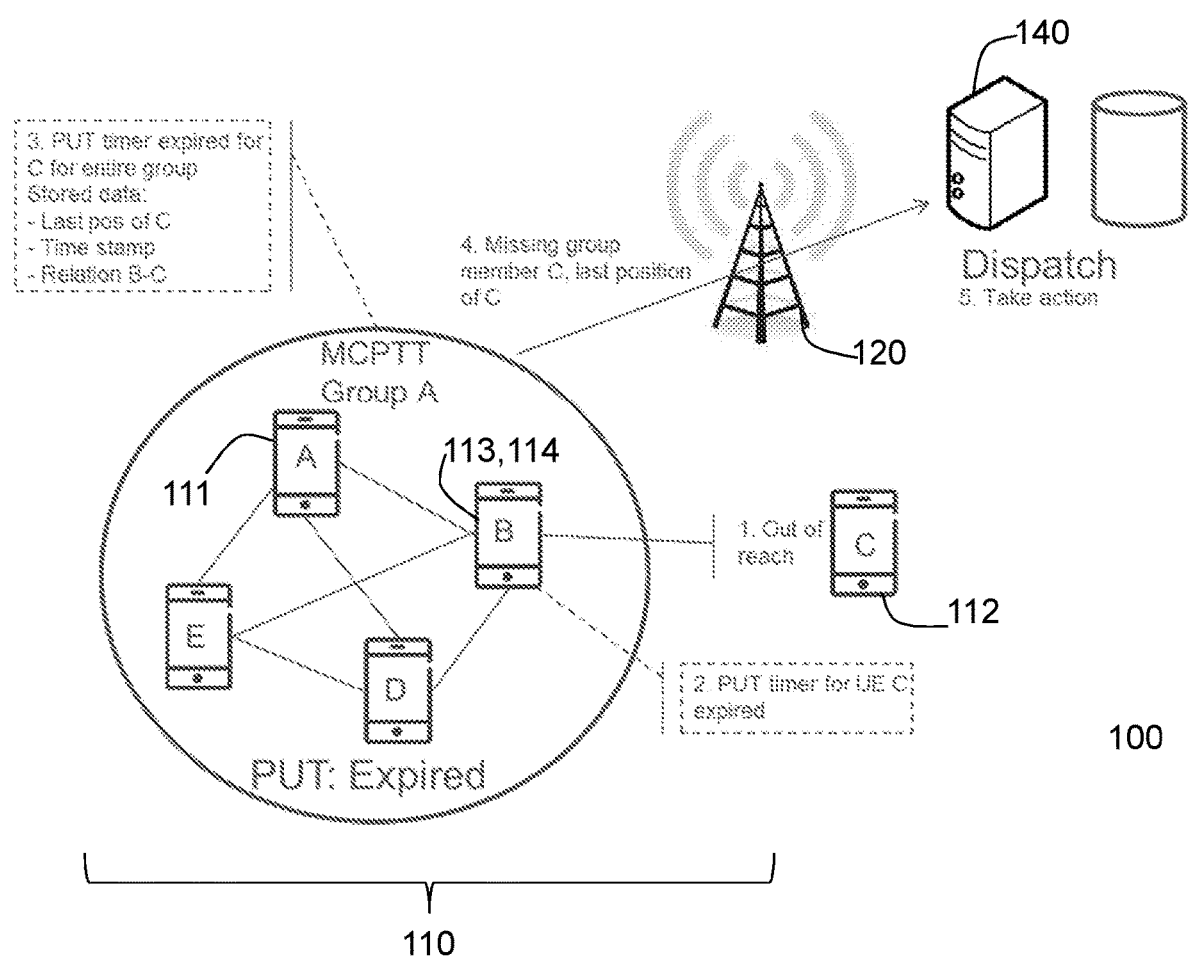
FIG. 6 is a schematic diagram illustrating an example of some actions of a according to embodiments herein.

FIG. 6 schematically illustrates another non-limiting example of embodiments herein. The respective timer is also here a Position Update Timer (PUT), whose policy has been agreed within the MCPTT group. Each UE dispatches its positioning data among its defined group of users. Each UE stores the position from other UEs in its defined group. According to Action 301, the third communication device 113 starts a PUT during which positioning data from the second communication device 112 should be updated. At some point, as indicated by number "1" in the Figure, the second communication device 112 becomes out of reach. If any UE, such as the third communication device 113, detects that its PUT for the second communication device 112 is expired, as indicated by number "2" in the Figure, the third communication device 113 adds a 'PUT Expiration Notification' tag to the position field to be dispatched among its group, according to Action 303. As indicated by number "3" in the Figure, the first communication device 111 may store the data received from the communication devices in the group of communication devices 110, such as the last known position of the second communication device 112, a time stamp of the collection of the data, and a relation between the second communication device 112 and the third communication device 113, such as for example, a distance between the two. When more than N number, the threshold, of users in the group have their PUT for the second communication device 112 expired, as determined according to Action 204, the first communication device 111, according to Action 205, transmits a group notification for "missing second communication device 112" along with its latest known position, as indicated by number "4" in the Figure. If the second communication device 112 somehow gets back on track and starts to dispatch its position again, other users' PUT expiration notification for the second communication device 112 is reset and "missing second communication device 112" is revoked, according to Action 206.

Figure 7:
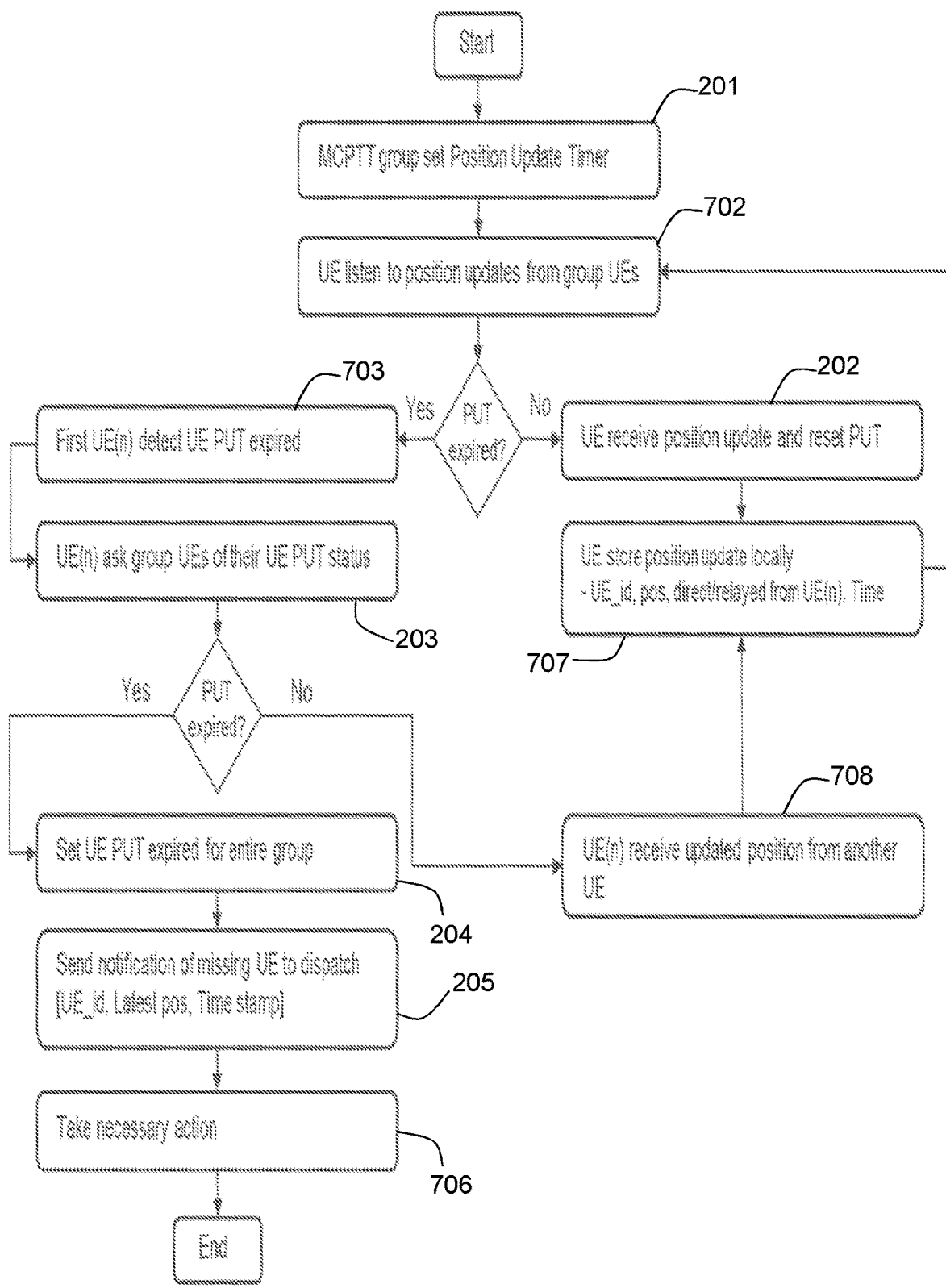
FIG. 7 is a flowchart depicting a method in a first communication device, according to embodiments herein.

FIG. 7 is a schematic flowchart of a non-limiting example of a method in the first communication device 111, according to embodiments herein. In this example, the communication devices in the group of communication devices 110 are UEs. The respective timer is a PUT kept by each of the communication devices in the group of communication devices 110. With each UE dispatching positioning data among its group of users, each UE stores the position from other UEs in its defined group and, according to Action 201 for the first communication device 111, starts a Position-Update-Timer (PUT) during which positioning data from UE X should be updated. UE X may be understood as an example of the second communication device 112. In Action 602, every UE in the group listens to position updates from group UEs. Historical position data is stored in each device and it is indicated if data is received direct or relayed via another device. This data may be used in case of an emergency to back-track a situation. In Action 603, as any user detects that PUT for UE X is expired, e.g., "first UE(n)" as an example of the third communication device 113, any user adds a PUT expiration notification tag to the position field to be dispatched. The first communication device 111, as "UE(n)" may then ask the group of UEs about their UE PUT status and receive the number of notifications according to Action 203. According to Action 204, when more than N of users in the group, apart from UE X that no longer seems to update its position, have their PUT for UE X expired, a group notification for "missing UE X" is transmitted along with its latest known position, according to Action 205. The PUT in every device in the group may be set to expired for UE X. The first communication device 111 may, according to Action 205, then send a notification of missing UE X to the dispatch, along with a UE identifier for UE X, the latest known position of UE X, and the time stamp of when that position was collected, also according to Action 205. The first communication device 111, as well as the receiving device 114, e.g., the dispatch, although the latter is not depicted in the Figure, may then take any necessary action to handle the situation that the UE X has gone missing in Action 606. If UE X somehow gets back on track and starts to dispatch its position, other users 'PUT expiration notification for UE X' is reset and the notification for "missing UE X" is revoked, according to Action 206. At any time the PUT timer is running, if a UE receives a position update from UE X, the PUT timer may be reset, according to Action 202. Every time the data from UE X is received, the data update about its position may be stored locally in Action 607. The data may be, for example, the UE identifier, the position, whether the position was obtained directly, or relayed via another communication device in the group of communication devices 110, and a time of reception of the data. The in data may be received, as in Action 608, in response to the request of PUT status that may have been sent by the first communication device 111.

As an overview of the foregoing, embodiments herein may be understood to relate to adding a timer during which, MCPTT user positions are to be updated within the group, which otherwise may trigger a notification of a potential loss of a group member.

An advantage of embodiments herein is that they enable users of a group of communication devices, for example, MCPTT users, to identify if a member of the group disappears, that is, if some type of emergency is perceived, without requiring that any member of the group actively calls and waits for an active response from a user.

Figure 8:
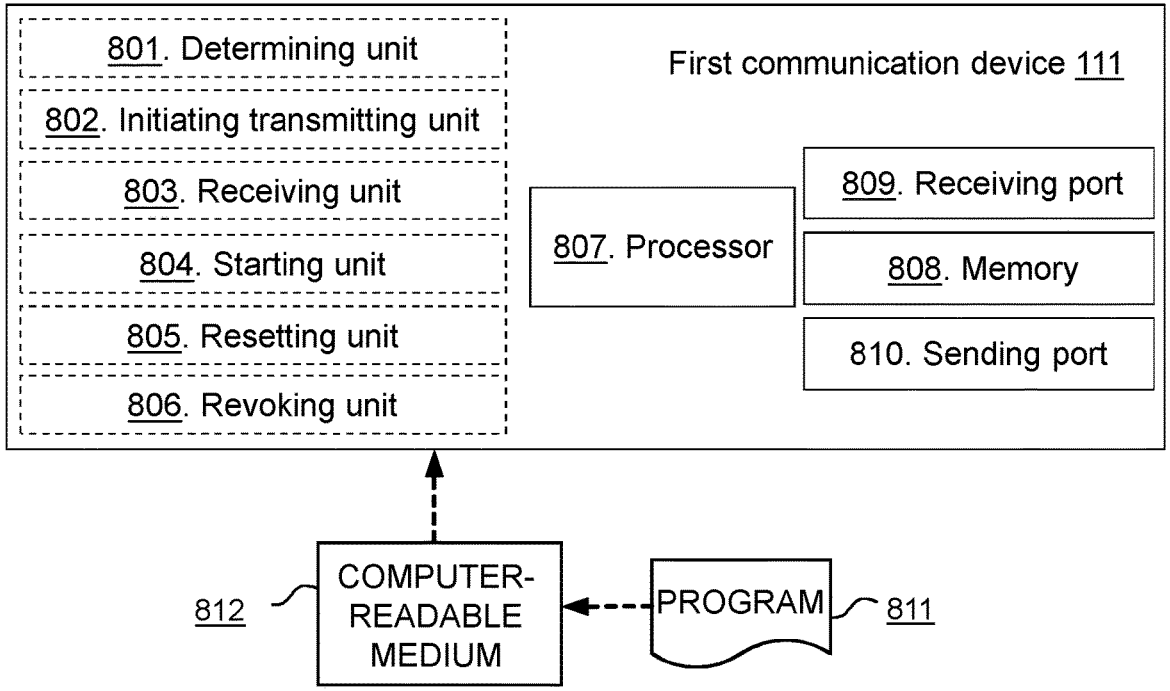
FIG. 8 is a schematic block diagram illustrating two non-limiting examples, a) and b), of a first communication device, according to embodiments herein.
Figure 8:
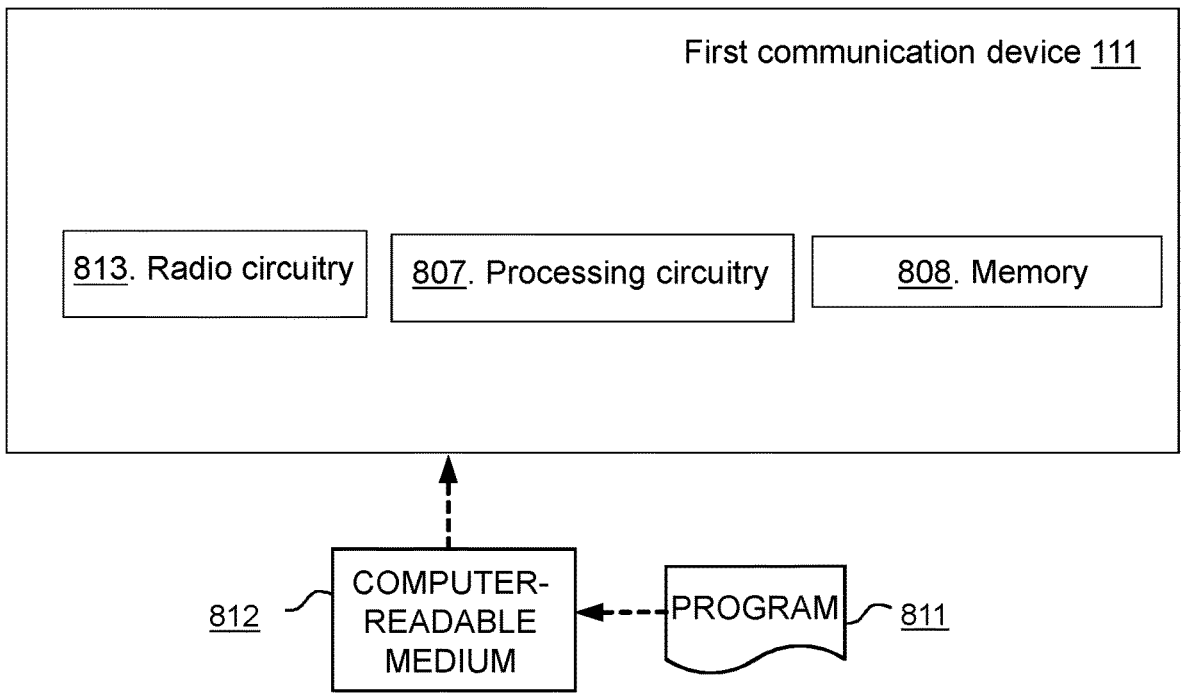

To perform the method actions described above in relation to FIG. 2, FIG. 4-6, and FIG. 7, the first communication device 111 may comprise the following arrangement depicted in FIG. 8. The first communication device 111 is configured to operate in the wireless communications network 100. The wireless communications network 100 is configured to comprise the group of communication devices 110.

The detailed description of some of the following corresponds to the same references provided above, in relation to the actions described for the first communication device 111, and will thus not be repeated here. For example, the respective time may be a PUT timer.

The first communication device 111 is configured to, e.g. by means of a determining unit 801 within the first communication device 111 configured to, determine that the number of communication devices, configured to be comprised in the group of communication devices 110, having reported that data about the position of the second communication device 112 configured to be comprised in the group of communication devices 110 has not been received within the time period, is above the threshold. The determining unit 801 may be a processor 807 of the first communication device 111, or an application running on such processor.

The first communication device 111 is also configured to, e.g. by means of an initiating transmitting unit 802 within the first communication device 111 configured to, initiate transmitting an indication to at least one receiving device 114, the indication being configured to indicate a result of the determination. The initiating transmitting unit 802 may be the processor 807 of the first communication device 111, or an application running on such processor.

In some embodiments, the at least one receiving device 114 may be at least one of: a) at least the third communication device 113 configured to be comprised in the group of communication devices 110, b) all the communication devices configured to be comprised in the group of communication devices 110, and c) the network node 120 configured to operate in the wireless communications network 100.

In some embodiments, to determine may be configured to be based on the respective timer configured to be kept by each of the communication devices configured to be comprised in the group of communication devices 110. The respective timer may be configured to define the time period during which the data is to be received. The duration of the time period having been may have been agreed to by the communication devices comprised in the group of communication devices 110.

In some embodiments, the first communication device 111 may be further configured to, e.g. by means of a receiving unit 803 within the first communication device 111 configured to, receive, from the communication devices configured to be comprised in the group of communication devices 110, the number of notifications of expiration of the respective timers. The determination may be configured to be based on the number of notifications configured to be received. The receiving unit 803 may be the processor 807 of the first communication device 111, or an application running on such processor.

In some embodiments, the time period may be configured to be defined according to at least one of the following: a) the previous pattern of silent frames on group communications configured to be maintained among the communication devices configured to be comprised in the group of communication devices 110; b) the time of the day the determination is performed; c) the degree of mobility of each of the communication devices configured to be comprised in the group of communication devices 110, d) the distance between each of the communication devices configured to be comprised in the group of communication devices 110, and e) the number of communication devices configured to be comprised in the group of communication devices 110.

The indication may be configured to comprise at least one of: a) the first indication that the second communication device 112 is missing, b) the second indication of the latest known position of the second communication device 112, and c) the third indication of a last measured signal strength between the second communication device 112 and at least one of the communication devices configured to be comprised in the group of communication devices 110.

In some embodiments, the first communication device 111 may be configured to, e.g. by means of a starting unit 804 within the first communication device 111 configured to, start the respective timer configured to define the time period during which the data is to be received. The starting unit 804 may be the processor 807 of the first communication device 111, or an application running on such processor.

In some embodiments, the first communication device 111 may be configured to, e.g. by means of a resetting unit 805 within the first communication device 111 configured to, reset the respective timer configured to be started based on at least one transmission configured to be received from the second communication device 112 before expiration of the time period. The resetting unit 805 may be the processor 807 of the first communication device 111, or an application running on such processor.

In some embodiments, the first communication device 111 may be further configured to, e.g. by means of a revoking unit 806 within the first communication device 111 configured to, revoke the indication to the at least one receiving device 114 based on at least one transmission configured to be detected from the second communication device 112 after expiration of the time period. The revoking unit 806 may be the processor 807 of the first communication device 111, or an application running on such processor.

The at least one transmission may be configured to be detected by the first communication device 111, or another communication device in the group of communication devices 110, receiving it from the second communication device 112 directly, or via another communication device, e.g., in the group of communication devices 110.

The embodiments herein may be implemented through one or more processors, such as a processor 807 in the first communication device 111 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the in the first communication device 111. One such carrier may be in the form of a CD ROM disc. It is however feasible with other data carriers such as a memory stick. The computer program code may furthermore be provided as pure program code on a server and downloaded to the first communication device 111.

The first communication device 111 may further comprise a memory 808 comprising one or more memory units. The memory 808 is arranged to be used to store obtained information, store data, configurations, schedulings, and applications etc. to perform the methods herein when being executed in the first communication device 111.

In some embodiments, the first communication device 111 may receive information from, e.g., the third communication device 113 or any of the other communication devices in the group of communication devices 110, or the receiving device 114, through a receiving port 809. In some examples, the receiving port 809 may be, for example, connected to one or more antennas in first communication device 111. In other embodiments, the first communication device 111 may receive information from another structure in the wireless communications network 100 through the receiving port 809. Since the receiving port 809 may be in communication with the processor 807, the receiving port 809 may then send the received information to the processor 807. The receiving port 809 may also be configured to receive other information.

The processor 807 in the first communication device 111 may be further configured to transmit or send information to e.g., the third communication device 113 or any of the other communication devices in the group of communication devices 110, or the receiving device 114, through a sending port 808, which may be in communication with the processor 807, and the memory 808.

Those skilled in the art will also appreciate that the determining unit 801, the initiating transmitting unit 802, the receiving unit 803, the starting unit 804, the resetting unit 805, and the revoking unit 806 described above may refer to a combination of analog and digital circuits, and/or one or more processors configured with software and/or firmware, e.g., stored in memory, that, when executed by the one or more processors such as the processor 807, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Thus, the methods according to the embodiments described herein for the first communication device 111 may be respectively implemented by means of a computer program 811 product, comprising instructions, i.e., software code portions, which, when executed on at least one processor 807, cause the at least one processor 807 to carry out the actions described herein, as performed by the first communication device 111. The computer program 811 product may be stored on a computer-readable storage medium 812. The computer-readable storage medium 812, having stored thereon the computer program 811, may comprise instructions which, when executed on at least one processor 807, cause the at least one processor 807 to carry out the actions described herein, as performed by the first communication device 111. In some embodiments, the computer-readable storage medium 812 may be a non-transitory computer-readable storage medium, such as a CD ROM disc, a memory stick, or stored in the cloud space. In other embodiments, the computer program 811 product may be stored on a carrier containing the computer program, wherein the carrier is one of an electronic signal, optical signal, radio signal, or the computer-readable storage medium 812, as described above.

Hence, embodiments herein also relate to the first communication device 111 operative to operate in the wireless communications network 100. The first communication device 111 may comprise the processing circuitry 807 and the memory 808, said memory 808 containing instructions executable by said processing circuitry 807, whereby the first communication device 111 is further operative to perform the actions described herein in relation to the first communication device 111, e.g., in FIG. 2, FIG. 4-6, FIG. 7, and/or FIG. 11-12.

Figure 9:
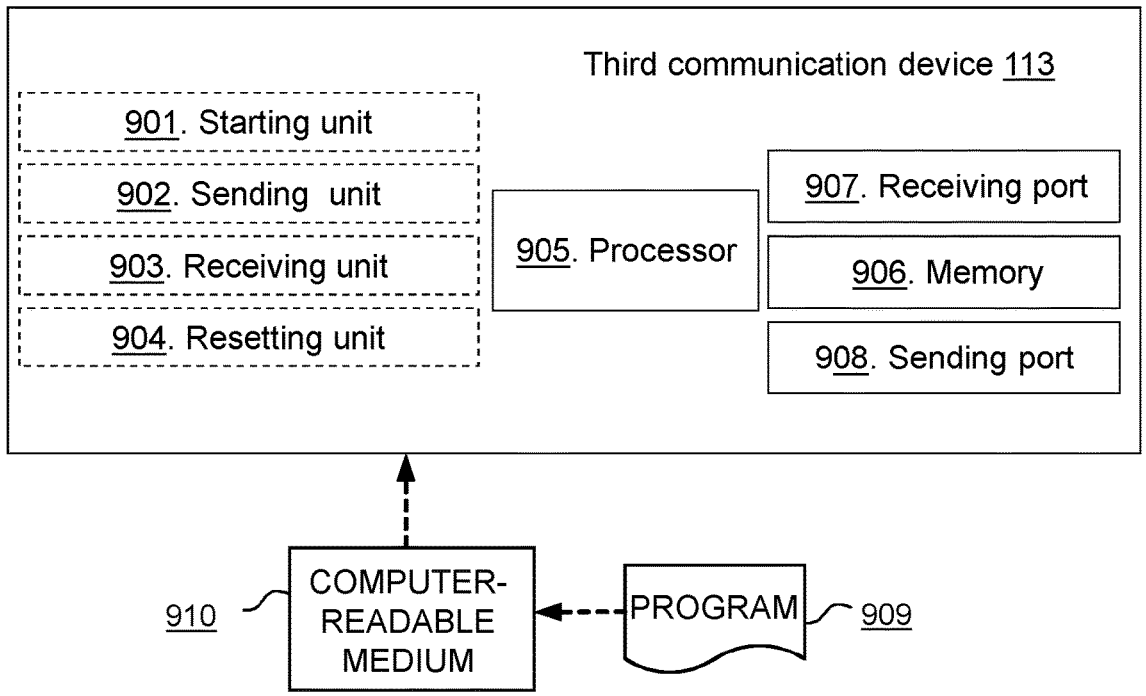
FIG. 9 is a schematic block diagram illustrating two non-limiting examples, a) and b), of a third communication device, according to embodiments herein.
Figure 9:
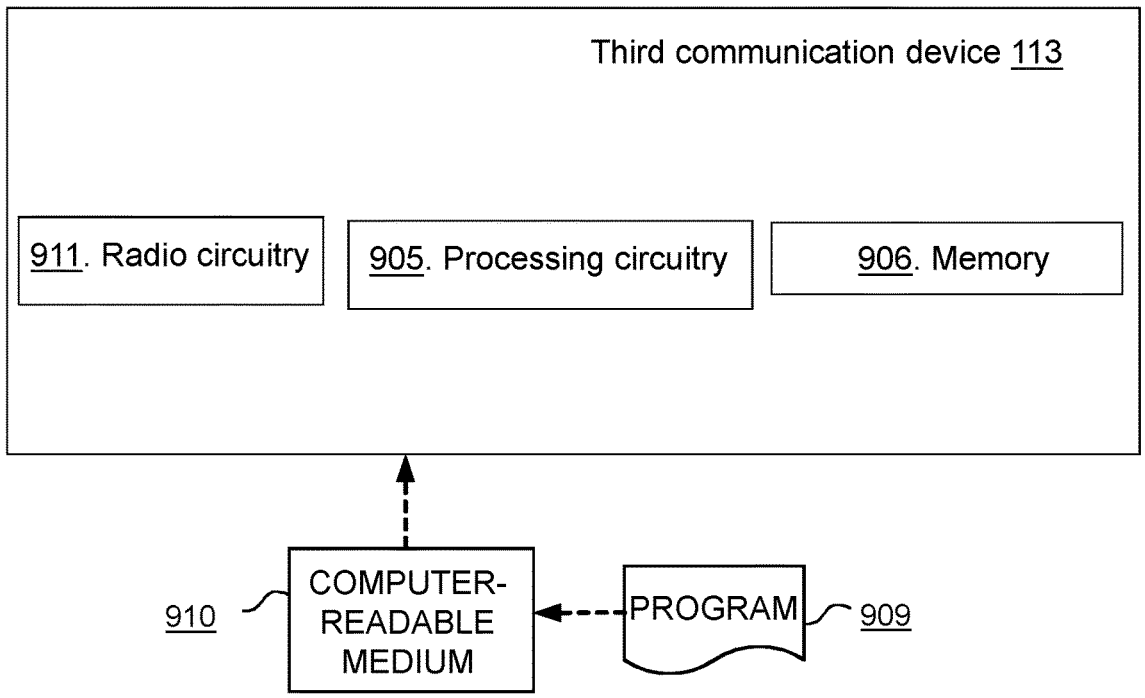

To perform the method actions described above in relation to FIG. 3, and FIGS. 4-6, the third communication device 113 may comprise the following arrangement depicted in FIG. 9. The third communication device 113 is configured to operate in the wireless communications network 100. The wireless communications network 100 is configured to comprise the group of communication devices 110. The third communication device 113 is configured to be comprised in the group of communication devices 110.

The detailed description of some of the following corresponds to the same references provided above, in relation to the actions described for the third communication device 113, and will thus not be repeated here. For example, the respective timer may be a PUT timer.

The third communication device 113 is configured to, e.g. by means of a starting unit 901 within the third communication device 113 configured to, start the respective timer configured to define the time period during which the data about the position of the second communication device 112 configured to be comprised in the group of communication devices 110 is to be received. The duration of the time period has been agreed to by the communication devices comprised in the group of communication devices 110. The starting unit 901 may be a processor 905 of the third communication device 113, or an application running on such processor.

The third communication device 113 is also configured to, e.g. by means of a sending unit 902 within the third communication device 113 configured to, send the notification to the at least one receiving device 114 configured to operate in the wireless communications network 100. The notification is of the expiration of the respective timer. To send the notification is configured to be performed after the expiration of the timer in the absence of data about the position of the second communication device 112 having been received within the time period. The sending unit 902 may be the processor 905 of the third communication device 113, or an application running on such processor.

In some embodiments, the third communication device 113 may be configured to, e.g. by means of a receiving unit 903 within the third communication device 113 configured to, receive the indication from the first communication device 111 configured to operate in the wireless communications network 100. The indication is configured to indicate that the number of communication devices, configured to be comprised in the group of communication devices 110, having reported that the data about the position of the second communication device 112 has not been received within the time period, is above the threshold. The receiving unit 903 may be a processor 905 of the third communication device 113, or an application running on such processor.

In some embodiments, the at least one receiving device 114 may be at least one of: a) the first communication device 111 configured to be comprised in the group of communication devices 110, and b) all the communication devices configured to be comprised in the group of communication devices 110.

In some embodiments, the time period may be configured to be defined according to at least one of the following: a) the previous pattern of silent frames on group communications configured to be maintained among the communication devices configured to be comprised in the group of communication devices 110, b) the time of the day the respective timer is started, c) the degree of mobility of each of the communication devices configured to be comprised in the group of communication devices 110, d) the distance between each of the communication devices configured to be comprised in the group of communication devices 110, and e) the number of communication devices configured to be comprised in the group of communication devices 110.

The notification configured to be sent may be configured to comprise at least one of: a) the first indication that the second communication device 112 is missing, b) the second indication of the latest known position of the second communication device 112, c) the third indication of the last measured signal strength between the second communication device 112 and the third communication device 113.

In some examples, the third communication device 113 may be further configured to, e.g. by means of the receiving unit 903 further configured to, receive a new indication from the first communication device 111, the new indication being configured to revoke, the indication, based on at least one transmission detected from the second communication device 112 after expiration of the time period.

In some embodiments, the third communication device 113 may be configured to, e.g. by means of a resetting unit 904 within the third communication device 113 configured to, reset the respective timer configured to be started, based on at least one transmission configured to be received from the second communication device 112 before expiration of the time period. The resetting unit 904 may be a processor 905 of the third communication device 113, or an application running on such processor.

In some examples, the third communication device 113 may be further configured to, e.g. by means of a resetting unit 904 further configured to, revoke the notification to the at least one receiving device 114, based on at least one transmission detected from the second communication device 112 after expiration of the time period. The at least one transmission may be configured to be detected by the third communication device 113 receiving it from the second communication device 112 directly, or via another communication device, e.g., in the group of communication devices 110.

The embodiments herein may be implemented through one or more processors, such as a processor 905 in the third communication device 113 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the third communication device 113. One such carrier may be in the form of a CD ROM disc. It is however feasible with other data carriers such as a memory stick. The computer program code may furthermore be provided as pure program code on a server and downloaded to the third communication device 113.

The third communication device 113 may further comprise a memory 906 comprising one or more memory units. The memory 906 is arranged to be used to store obtained information, store data, configurations, schedulings, and applications etc. to perform the methods herein when being executed in the third communication device 113.

In some embodiments, the third communication device 113 may receive information from, e.g., the first communication device 111 or any of the other communication devices in the group of communication devices 110, or the receiving device 114, through a receiving port 907. In some examples, the receiving port 907 may be, for example, connected to one or more antennas in third communication device 113. In other embodiments, the third communication device 113 may receive information from another structure in the wireless communications network 100 through the receiving port 907. Since the receiving port 907 may be in communication with the processor 905, the receiving port 907 may then send the received information to the processor 905. The receiving port 907 may also be configured to receive other information.

The processor 905 in the third communication device 113 may be further configured to transmit or send information to e.g., the first communication device 111 or any of the other communication devices in the group of communication devices 110, or the receiving device 114, through a sending port 908, which may be in communication with the processor 905, and the memory 906.

Those skilled in the art will also appreciate that the starting unit 901, the sending unit 902, the receiving unit 903, and the resetting unit 904 described above may refer to a combination of analog and digital circuits, and/or one or more processors configured with software and/or firmware, e.g., stored in memory, that, when executed by the one or more processors such as the processor 905, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Thus, the methods according to the embodiments described herein for the third communication device 113 may be respectively implemented by means of a computer program 909 product, comprising instructions, i.e., software code portions, which, when executed on at least one processor 905, cause the at least one processor 905 to carry out the actions described herein, as performed by the third communication device 113. The computer program 909 product may be stored on a computer-readable storage medium 910. The computer-readable storage medium 910, having stored thereon the computer program 909, may comprise instructions which, when executed on at least one processor 905, cause the at least one processor 905 to carry out the actions described herein, as performed by the third communication device 113. In some embodiments, the computer-readable storage medium 910 may be a non-transitory computer-readable storage medium, such as a CD ROM disc, a memory stick, or stored in the cloud space. In other embodiments, the computer program 909 product may be stored on a carrier containing the computer program, wherein the carrier is one of an electronic signal, optical signal, radio signal, or the computer-readable storage medium 910, as described above.

Hence, embodiments herein also relate to the third communication device 113 operative to operate in the wireless communications network 100. The third communication device 113 may comprise the processing circuitry 905 and the memory 906, said memory 906 containing instructions executable by said processing circuitry 905, whereby the third communication device 113 is further operative to perform the actions described herein in relation to the third communication device 113, e.g., in FIG. 3, FIG. 4-6, and/or FIG. 11 and FIG. 13.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

Further Extensions and Variations

Figure 10:
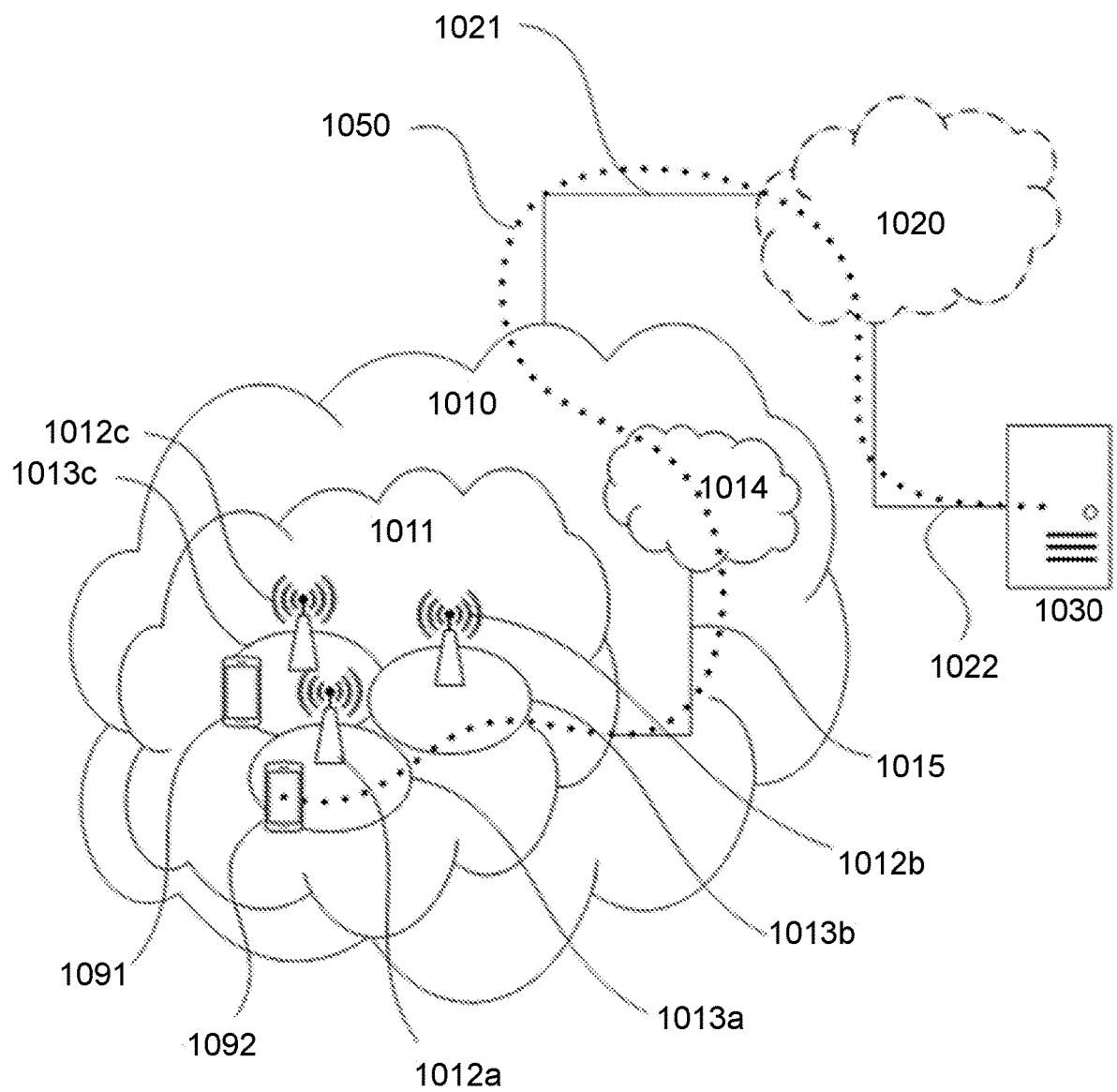
FIG. 10 is a schematic block diagram illustrating a telecommunication network connected via an intermediate network to a host computer, according to embodiments herein.

With reference to FIG. 10, in accordance with an embodiment, a communication system includes telecommunication network 1010 such as the wireless communications network 100, for example, a 3GPP-type cellular network, which comprises access network 1011, such as a radio access network, and core network 1014. Access network 1011 comprises a plurality of network nodes such as the network node 120. For example, base stations 1012*a*, 1012*b*, 1012*c*, such as NBs, eNBs, gNBs or other types of wireless access points, each defining a corresponding coverage area 1013*a*, 1013*b*, 1013*c*. Each base station 1012*a*, 1012*b*, 1012*c* is connectable to core network 1014 over a wired or wireless connection 1015. A plurality of wireless devices, such as the first communication device 111, in some examples, and any of the communication devices comprised in the group of communication devices 110 are comprised in the wireless communications network 100. In FIG. 10, a first UE 1091 located in coverage area 1013*c* is configured to wirelessly connect to, or be paged by, the corresponding base station 1012*c*. A second UE 1092 in coverage area 1013*a* is wirelessly connectable to the corresponding base station 1012*a*. While a plurality of UEs 1091, 1092 are illustrated in this example, the disclosed embodiments are equally applicable to a situation where a sole UE is in the coverage area or where a sole UE is connecting to the corresponding base station 1012. Any of the UEs 1091, 1092 are examples of the first communication device 111, or any of the communication devices comprised in the group of communication devices 110.

Telecommunication network 1010 is itself connected to host computer 1030, which may be embodied in the hardware and/or software of a standalone server, a cloud-implemented server, a distributed server or as processing resources in a server farm. Host computer 1030 may be considered yet another example of the receiving device 114. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

In relation to FIGS. 11, 12, and 13, which are described next, it may be understood that a UE is an example of the first communication device 111, and that any description provided for the UE equally applies to the first communication device 111. It may be also understood that the base station is an example of the network node 120, which may be an example of the receiving device 114, and that any description provided for the base station equally applies to the network node 120.

Example implementations, in accordance with an embodiment, of the first communication device 111, e.g., a UE, the network node 120, e.g., a base station and host computer discussed in the preceding paragraphs will now be described with reference to FIG. 11. FIG. 11 is a schematic diagram illustrating a host computer communicating via a base station with a user equipment over a partially wireless connection in accordance with some embodiments In communication system 1100, such as the wireless communications network 100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Figure 11:
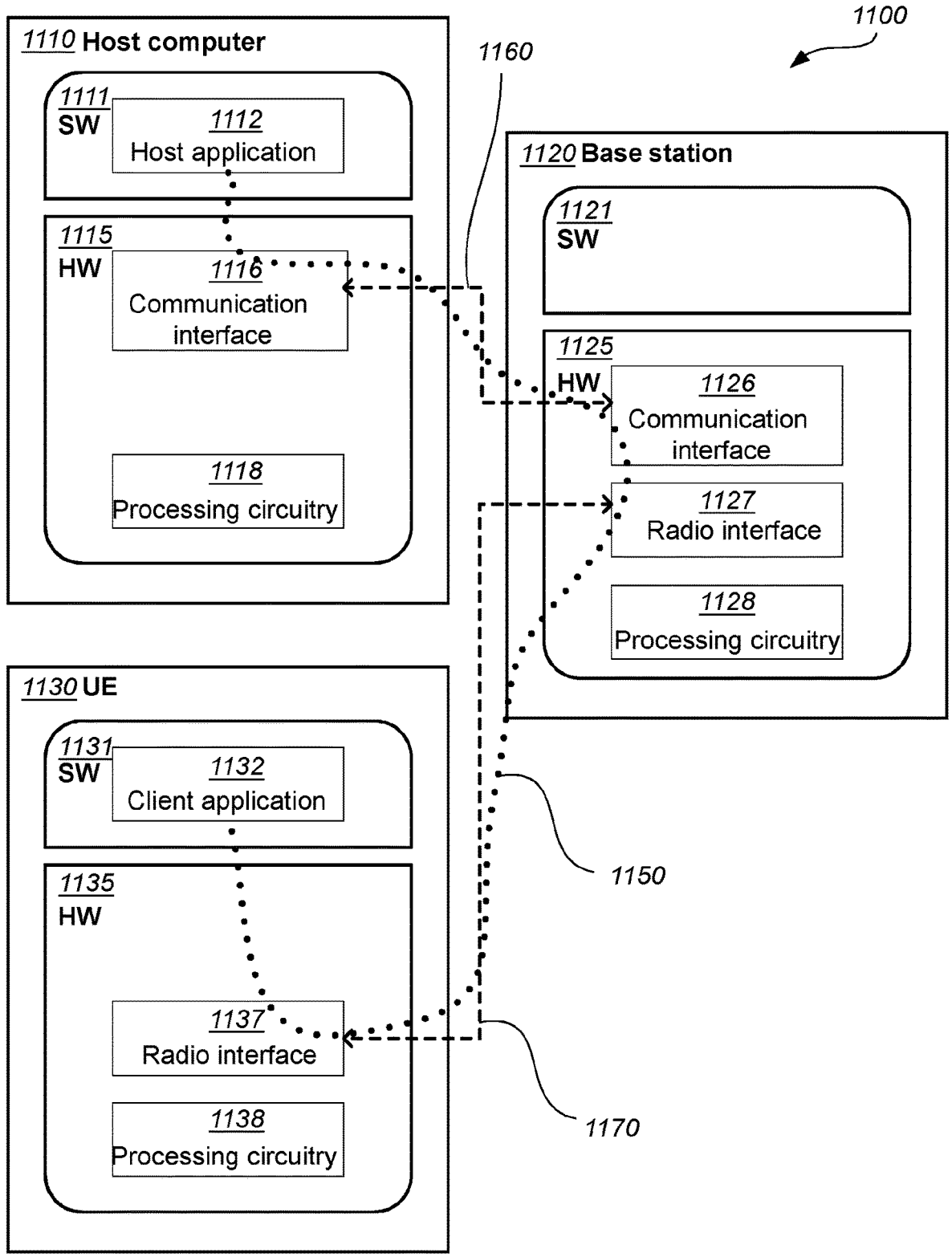
FIG. 11 is a generalized block diagram of a host computer communicating via a base station with a user equipment over a partially wireless connection, according to embodiments herein.

Communication system 1100 further includes the network node 120, exemplified in FIG. 11 as a base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with the first communication device 111, exemplified in FIG. 11 as a UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

It is noted that host computer 1110, base station 1120 and UE 1130 illustrated in FIG. 11 may be similar or identical to host computer 1030, one of base stations 1012*a*, 1012*b*, 1012*c* and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

Figure 12:
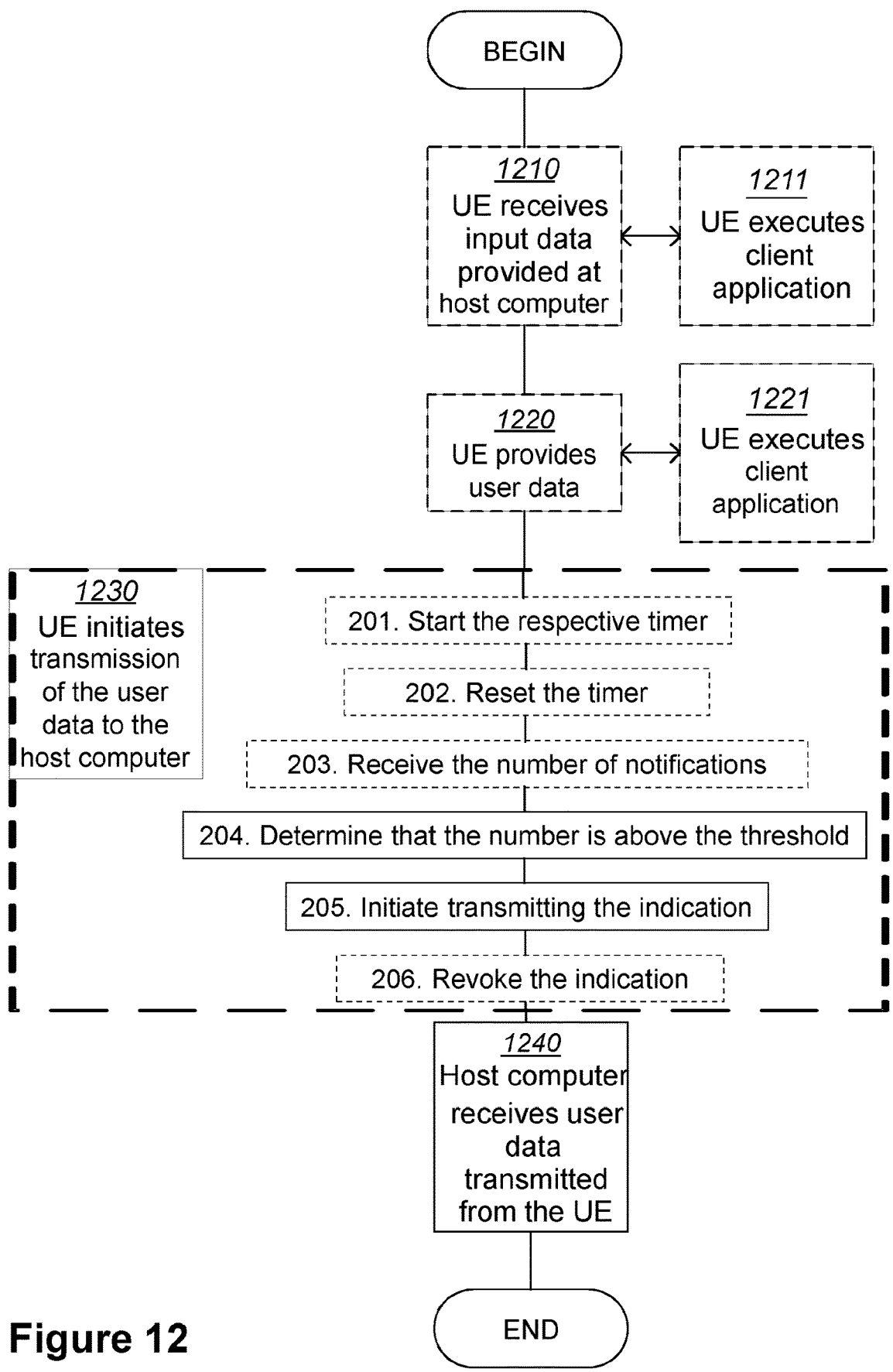
FIG. 12 is a flowchart depicting embodiments of a method in a communications system including a host computer, a base station and a user equipment, according to embodiments herein.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer, according to embodiments herein. In step 1240 of the method, the host computer receives the user data transmitted from the UE, in accordance with the teachings of the embodiments described throughout this disclosure.

Figure 13:
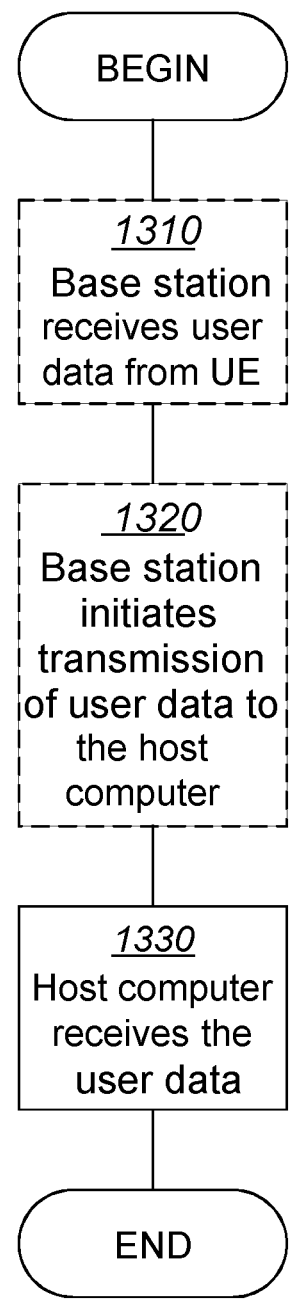
FIG. 13 is a flowchart depicting embodiments of a method in a communications system including a host computer, a base station and a user equipment, according to embodiments herein.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments

1. A communication system including a host computer comprising:
   a communication interface configured to receive user data originating from a transmission from a user equipment (UE) to a base station,
   wherein the UE comprises a radio interface and processing circuitry, the UE's processing circuitry configured to:
   determine that a number of communication devices, configured to be comprised in the group of communication devices (110), having reported that data about a position of a second communication device (112) configured to be comprised in the group of communication devices (110) has not been received within a time period, is above a threshold, and
   initiate transmitting an indication to at least one receiving device (114), the indication being configured to indicate a result of the determination.
2. The communication system of embodiment 1, the UE's processing circuitry being configured to:
   receive, from the communication devices configured to be comprised in the group of communication devices (110), a number of notifications of expiration of the respective timers, and wherein the determination is configured to be based on the number of notifications configured to be received
3. The communication system of any of embodiments 1-2, the UE's processing circuitry being configured to at least one of:
   start the respective timer configured to define the time period during which the data is to be received, and
   reset the respective timer configured to be started based on at least one transmission configured to be received from the second communication device (112) before expiration of the time period.
3. The communication system of any of embodiments 1-2, the UE's processing circuitry being configured to:
   revoke the indication to the at least one receiving device (114) based on at least one transmission configured to be detected from the second communication device (112) after expiration of the time period.
4. The communication system of any of embodiments 1-3, further including the UE.
5. The communication system of embodiment 4, further including the base station, wherein the base station comprises a radio interface configured to communicate with the UE and a communication interface configured to forward to the host computer the user data carried by a transmission from the UE to the base station.

6. The communication system of embodiment 4 or 5, wherein:
   the processing circuitry of the host computer is configured to execute a host application; and
   the UE's processing circuitry is configured to execute a client application associated with the host application, thereby providing the user data.
7. The communication system of embodiment 4 or 5, wherein:
   the processing circuitry of the host computer is configured to execute a host application, thereby providing request data; and
   the UE's processing circuitry is configured to execute a client application associated with the host application, thereby providing the user data in response to the request data.
8. A method implemented in a user equipment (UE), comprising:
   determining (204) that a number of communication devices, comprised in the group of communication devices (110), having reported that data about a position of the second communication device (112) has not been received within a time period, is above a threshold, and
   initiating (205) transmitting an indication to at least one receiving device (114), the indication indicating a result of the determination.
9. The method of embodiment 8, further comprising:
   receiving (203), from the communication devices comprised in the group of communication devices (110), a number of notifications of expiration of the respective timers, and wherein the determining (204) is based on the received number of notifications
10. The method of any of embodiments 8-9, further comprising at least one of:
    starting (201) the respective timer defining the time period during which the data is to be received, and
    resetting (202) the started respective timer based on at least one transmission received from the second communication device (112) before expiration of the time period.
11. The method of any of embodiments 8-10, further comprising at least one of:
    revoking (206) the indication to the at least one receiving device (114) based on at least one transmission detected from the second communication device (112) after expiration of the time period.
12. The method of any of embodiments 8-11, further comprising:
    providing user data; and
    forwarding the user data to a host computer via the transmission to the base station.
13. A method implemented in a communication system including a host computer, a base station and a user equipment (UE), the method comprising:
    at the host computer, receiving user data transmitted to the base station from the UE, wherein the UE performs the following:
    determining (204) that a number of communication devices, comprised in the group of communication devices (110), having reported that data about a position of the second communication device (112) has not been received within a time period, is above a threshold, and
    initiating (205) transmitting an indication to at least one receiving device (114), the indication indicating a result of the determination.

14. The method of embodiment 13, further comprising the UE:
   receiving (203), from the communication devices comprised in the group of communication devices (110), a number of notifications of expiration of the respective timers, and wherein the determining (204) is based on the received number of notifications 15. The method of any of embodiments 13-14, further comprising the UE at least one of:
   starting (201) the respective timer defining the time period during which the data is to be received, and
   resetting (202) the started respective timer based on at least one transmission received from the second communication device (112) before expiration of the time period.

16. The method of any of embodiments 13-15, further comprising the UE:
   revoking (206) the indication to the at least one receiving device (114) based on at least one transmission detected from the second communication device (112) after expiration of the time period.

17. The method of any of embodiments 13-16, further comprising:
   at the UE, providing the user data to the base station.

18. The method of embodiment 17, further comprising:
   at the UE, executing a client application, thereby providing the user data to be transmitted; and
   at the host computer, executing a host application associated with the client application.

19. The method of embodiment 17, further comprising:
   at the UE, executing a client application; and
   at the UE, receiving input data to the client application, the input data being provided at the host computer by executing a host application associated with the client application,
   wherein the user data to be transmitted is provided by the client application in response to the input data.

20. A method implemented in a communication system including a host computer, a base station and a user equipment (UE), the method comprising:
   at the host computer, receiving, from the base station, user data originating from a transmission which the base station has received from the UE, wherein the UE performs the following:
      determining (204) that a number of communication devices, comprised in the group of communication devices (110), having reported that data about a position of the second communication device (112) has not been received within a time period, is above a threshold, and
      initiating (205) transmitting an indication to at least one receiving device (114), the indication indicating a result of the determination.

21. The method of embodiment 20, further comprising the UE:
   receiving (203), from the communication devices comprised in the group of communication devices (110), a number of notifications of expiration of the respective timers, and wherein the determining (204) is based on the received number of notifications 22. The method of any of embodiments 20-21, further comprising the UE at least one of:
   starting (201) the respective timer defining the time period during which the data is to be received, and
   resetting (202) the started respective timer based on at least one transmission received from the second communication device (112) before expiration of the time period.

23. The method of any of embodiments 20-22, further comprising the UE:
   revoking (206) the indication to the at least one receiving device (114) based on at least one transmission detected from the second communication device (112) after expiration of the time period.

24. The method of any of embodiments 20-23, further comprising:
   at the base station, receiving the user data from the UE.

25. The method of embodiment 24, further comprising:
   at the base station, initiating a transmission of the received user data to the host computer.

The invention claimed is:

1. A method performed by a first communication device operating in a wireless communications network, the wireless communications network comprising a group of communication devices, the method comprising:
   determining that a number of communication devices, comprised in the group of communication devices, having reported that data about a position of a second communication device comprised in the group of communication devices has not been received within a time period, is above a threshold, and
   initiating transmitting an indication to at least one receiving device, the indication indicating a result of the determination.

2. The method according to claim 1, wherein the at least one receiving device is at least one of: a) at least a third communication device comprised in the group of communication devices, b) all the communication devices comprised in the group of communication devices, and c) a network node operating in the wireless communications network.

3. The method according to claim 1, wherein the determining is based on a respective timer kept by each of the communication devices comprised in the group of communication devices, the respective timer defining the time period during which the data is to be received, a duration of the time period having been agreed to by the communication devices comprised in the group of communication devices, and
   receiving, from the communication devices comprised in the group of communication devices, a number of notifications of expiration of the respective timers, and wherein the determining is based on the received number of notifications.

4. The method according to claim 3, wherein the time period is defined according to at least one of the following:
   a previous pattern of silent frames on group communications maintained among the communication devices comprised in the group of communication devices,
   a time of the day the determining is performed,
   a degree of mobility of each of the communication devices comprised in the group of communication devices,
   a distance between each of the communication devices comprised in the group of communication devices, and
   a number of communication devices comprised in the group of communication devices.

5. The method according to claim 1, wherein the indication comprises at least one of:
   a first indication that the second communication device is missing, a second indication of a latest known position of the second communication device, and a third indication of a last measured signal strength between the second communication device and at least one of the communication devices comprised in the group of communication devices.

6. The method according to claim 1, further comprising at least one of:

starting the respective timer defining the time period during which the data is to be received, and resetting the started respective timer based on at least one transmission received from the second communication device before expiration of the time period, and revoking the indication to the at least one receiving device based on at least one transmission detected from the second communication device after expiration of the time period.

7. A method performed by a third communication device operating in a wireless communications network, the wireless communications network comprising a group of communication devices, the third communication device being comprised in the group of communication devices, the method comprising:

starting a respective timer defining a time period during which data about a position of a second communication device comprised in the group of communication devices is to be received, a duration of the time period having been agreed to by the communication devices comprised in the group of communication devices, resetting the started respective timer based on at least one transmission received from the second communication device before expiration of the time period, sending a notification to at least one receiving device operating in the wireless communications network, the notification being of an expiration of the respective timer, the sending being performed after the expiration of the timer in the absence of data about the position of the second communication device having been received within the time period, and receiving an indication from a first communication device operating in the wireless communications network, the indication indicating that a number of communication devices, comprised in the group of communication devices, having reported that the data about the position of the second communication device has not been received within the time period, is above a threshold.

8. The method according to claim 7, wherein the at least one receiving device is at least one of: a) a first communication device comprised in the group of communication devices, and b) all the communication devices comprised in the group of communication devices.

9. The method according to claim 7, wherein the time period is defined according to at least one of the following:

a previous pattern of silent frames on group communications maintained among the communication devices comprised in the group of communication devices, a time of the day the respective timer is started, a degree of mobility of each of the communication devices comprised in the group of communication devices, a distance between each of the communication devices comprised in the group of communication devices, and a number of communication devices comprised in the group of communication devices.

10. The method according to claim 7, wherein the sent notification comprises at least one of:

a first indication that the second communication device is missing, a second indication of a latest known position of the second communication device, a third indication of a last measured signal strength between the second communication device and the third communication device.

11. A first communication device configured to operate in a wireless communications network, the wireless communications network being configured to comprise a group of communication devices, the first communication device being further configured to:

determine that a number of communication devices, configured to be comprised in the group of communication devices, having reported that data about a position of a second communication device configured to be comprised in the group of communication devices has not been received within a time period, is above a threshold, and initiate transmitting an indication to at least one receiving device, the indication being configured to indicate a result of the determination.

12. The first communication device according to claim 11, wherein the at least one receiving device is at least one of: a) at least a third communication device configured to be comprised in the group of communication devices, b) all the communication devices configured to be comprised in the group of communication devices, and c) a network node configured to operate in the wireless communications network, and/or wherein to determine is configured to be based on a respective timer configured to be kept by each of the communication devices configured to be comprised in the group of communication devices, the respective timer being configured to define the time period during which the data is to be received, a duration of the time period having been agreed to by the communication devices comprised in the group of communication devices.

13. The first communication device according to claim 12, being further configured to:

receive, from the communication devices configured to be comprised in the group of communication devices, a number of notifications of expiration of the respective timers, and wherein the determination is configured to be based on the number of notifications configured to be received.

14. The first communication device according to claim 12, wherein the time period is configured to be defined according to at least one of the following:

a previous pattern of silent frames on group communications configured to be maintained among the communication devices configured to be comprised in the group of communication devices, a time of the day the determination is performed, a degree of mobility of each of the communication devices configured to be comprised in the group of communication devices, a distance between each of the communication devices configured to be comprised in the group of communication devices, and a number of communication devices configured to be comprised in the group of communication devices.

15. The first communication device according to claim 11, wherein the indication is configured to comprise at least one of:

a first indication that the second communication device is missing, a second indication of a latest known position of the second communication device, and a third indication of a last measured signal strength between the second communication device and at least one of the communication devices configured to be comprised in the group of communication devices.

16. The first communication device according to claim 11, further configured to at least one of:
    start the respective timer configured to define the time period during which the data is to be received,
    reset the respective timer configured to be started based on at least one transmission configured to be received from the second communication device before expiration of the time period, and
    revoke the indication to the at least one receiving device based on at least one transmission configured to be detected from the second communication device after expiration of the time period.

17. A third communication device configured to operate in a wireless communications network, the wireless communications network being configured to comprise a group of communication devices, the third communication device being configured to be comprised in the group of communication devices, the third communication device being further configured to:
    start a respective timer configured to define a time period during which data about a position of a second communication device configured to be comprised in the group of communication devices is to be received, a duration of the time period having been agreed to by the communication devices comprised in the group of communication devices,
    reset the respective timer configured to be started, based on at least one transmission configured to be received from the second communication device before expiration of the time period,
    send a notification to at least one receiving device configured to operate in the wireless communications network, the notification being of an expiration of the respective timer, wherein to send the notification is configured to be performed after the expiration of the timer in the absence of data about the position of the second communication device having been received within the time period, and
    receive an indication from a first communication device configured to operate in the wireless communications network, the indication being configured to indicate that a number of communication devices, configured to be comprised in the group of communication devices, having reported that the data about the position of the second communication device has not been received within the time period, is above a threshold.

18. The third communication device according to claim 17,
    wherein the at least one receiving device is at least one of:
    a) a first communication device configured to be comprised in the group of communication devices, and b) all the communication devices configured to be comprised in the group of communication devices.

19. The third communication device according to claim 17, wherein the time period is configured to be defined according to at least one of the following:
    a previous pattern of silent frames on group communications configured to be maintained among the communication devices configured to be comprised in the group of communication devices,
    a time of the day the respective timer is started,
    a degree of mobility of each of the communication devices configured to be comprised in the group of communication devices,
    a distance between each of the communication devices configured to be comprised in the group of communication devices, and
    a number of communication devices configured to be comprised in the group of communication devices.

20. The third communication device according to claim 17, wherein the notification configured to be sent is configured to comprise at least one of:
    a first indication that the second communication device is missing,
    a second indication of a latest known position of the second communication device,
    a third indication of a last measured signal strength between the second communication device and the third communication device.

* * * * *